US011967914B2

United States Patent
Morita et al.

(10) Patent No.: US 11,967,914 B2
(45) Date of Patent: Apr. 23, 2024

(54) VIBRATION ACTUATOR CONTROL APPARATUS

(71) Applicant: CANON KABUSHIKI KAISHA, Tokyo (JP)

(72) Inventors: Hiromitsu Morita, Saitama (JP); Shinji Yamamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 2 days.

(21) Appl. No.: 17/484,849

(22) Filed: Sep. 24, 2021

(65) Prior Publication Data

US 2022/0103108 A1    Mar. 31, 2022

(30) Foreign Application Priority Data

Sep. 28, 2020 (JP) ................................ 2020-162587

(51) Int. Cl.
 *H02P 25/032* (2016.01)
 *G01M 7/02* (2006.01)
 *H02N 2/14* (2006.01)
(52) U.S. Cl.
 CPC ........... *H02P 25/032* (2016.02); *G01M 7/022* (2013.01); *H02N 2/142* (2013.01)
(58) Field of Classification Search
 CPC .............................. H02P 25/032; H02N 2/142
 See application file for complete search history.

(56) References Cited

U.S. PATENT DOCUMENTS

| 4,439,849 | A | * | 3/1984 | Nabeshima | ............ | G11B 19/24 |
| | | | | | | 369/111 |
| 5,642,949 | A | * | 7/1997 | Yamamoto | ........... | B41J 13/0009 |
| | | | | | | 400/279 |
| 5,955,819 | A | * | 9/1999 | Takano | .................. | H02N 2/008 |
| | | | | | | 310/317 |
| 6,084,334 | A | * | 7/2000 | Yamamoto | ............. | H02N 2/142 |
| | | | | | | 310/316.01 |

(Continued)

FOREIGN PATENT DOCUMENTS

EP     2393136 A2    12/2011
JP    H0880076 A     3/1996

(Continued)

*Primary Examiner* — Rina I Duda
(74) *Attorney, Agent, or Firm* — Canon U.S.A., Inc. I.P. Division

(57) ABSTRACT

A vibration actuator control device includes a control unit and a driving unit. The control unit outputs a first control signal for controlling driving of a first vibration actuator including a first vibrating body and a first contact body, and outputs a second control signal for controlling driving of a second vibration actuator and including a second vibrating body. The driving unit (i) outputs a first alternating-current voltage in a first plurality of phases set based on the first control signal, and (ii) outputs a second alternating-current voltage in a second plurality of phases set based on the second control signal. The control unit individually sets a phase difference of the first alternating-current voltage based on the first control signal and sets a phase difference of the second alternating-current voltage based on the second control signal, and commonly sets a first alternating-current voltage frequency and a second alternating-current voltage frequency.

17 Claims, 20 Drawing Sheets

(56) References Cited

U.S. PATENT DOCUMENTS

| | | | | |
|---|---|---|---|---|
| 7,919,945 B2* | 4/2011 | Houston | ................. | A63F 13/24 |
| | | | | 318/128 |
| 2010/0213882 A1 | 8/2010 | Adachi | | |
| 2014/0340002 A1* | 11/2014 | Nishimoto | ............. | H02N 2/142 |
| | | | | 318/116 |
| 2015/0114164 A1* | 4/2015 | Urano | .................... | H02N 2/004 |
| | | | | 310/317 |
| 2016/0329837 A1* | 11/2016 | Kataoka | ............... | A61B 5/0263 |

FOREIGN PATENT DOCUMENTS

| | | | |
|---|---|---|---|
| JP | 2007143231 A | 6/2007 |
| JP | 2010074900 A | 4/2010 |
| JP | 2011259559 A | 12/2011 |
| JP | 2015128367 A | 7/2015 |
| JP | 2016154417 A | 8/2016 |
| JP | 2019198199 A | 11/2019 |

\* cited by examiner

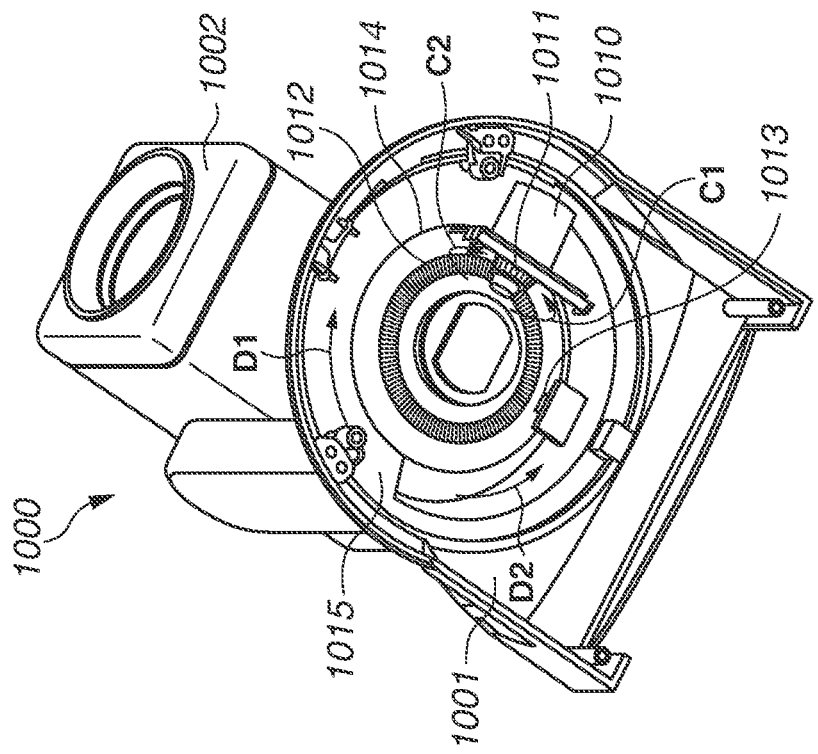
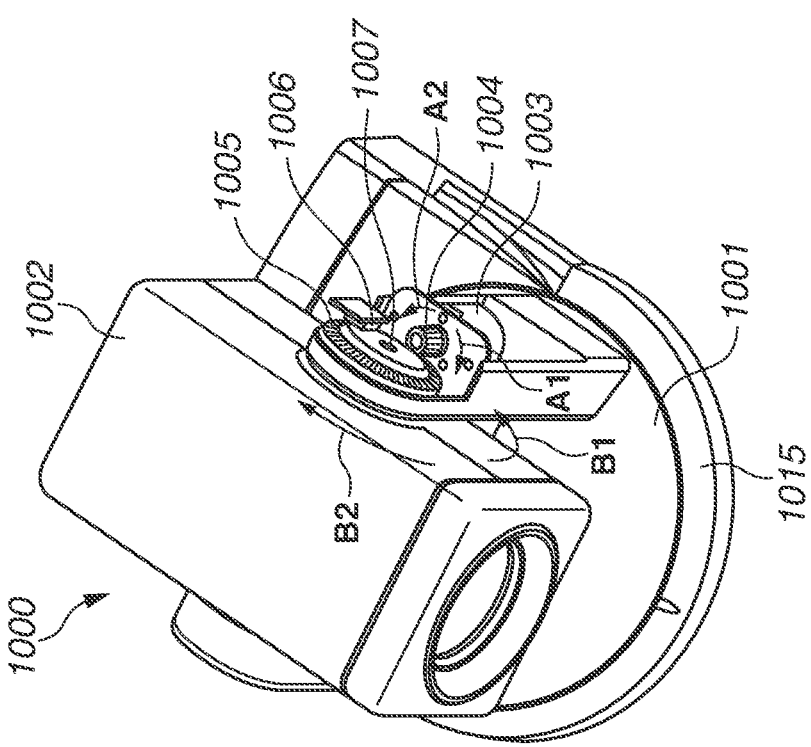

VIBRATION ACTUATOR CONTROL APPARATUS

This application claims the benefit of Japanese Patent Application No. 2020-162587, filed Sep. 28, 2020, which is hereby incorporated by reference herein in its entirety.

BACKGROUND

Field

The present disclosure relates to a vibration actuator control device, a vibration driving apparatus including the same, and an electronic device.

Description of the Related Art

Conventionally, a vibration actuator in which a contact body in contact with a vibrating body moves relative to the vibrating body by a vibration generated in the vibrating body is discussed in various ways. In recent years, an apparatus including a plurality of vibration actuators simultaneously drives the plurality of vibration actuators in some cases. If a difference in driving frequency (a driving frequency difference) occurs between the plurality of vibration actuators (between the vibration actuators) when the plurality of vibration actuators is simultaneously driven, a beat note is produced.

Japanese Patent Application Laid-Open No. 8-80076 discusses a technique for configuring a device with built-in actuators so that the driving frequency difference between a plurality of ultrasonic motors (vibration actuators) is smaller than 1000 Hz to reduce a beat note produced due to the driving frequency difference when the plurality of ultrasonic motors (vibration actuators) is simultaneously driven.

In Japanese Patent Application Laid-Open No. 8-80076, however, the driving frequency difference between the plurality of ultrasonic actuators is set to be smaller than 1000 Hz. This limits the ranges of driving frequencies that can be adopted by the plurality of ultrasonic actuators. This results in reducing the ranges of driving speeds that can be adopted by the plurality of ultrasonic actuators.

SUMMARY

The present disclosure is directed to providing a vibration actuator control device that prevents reductions in the ranges of driving speeds that can be adopted by a plurality of vibration actuators as compared with a conventional vibration actuator control device.

According to an aspect of the present disclosure, a vibration actuator control device includes a control unit configured to output a first control signal for controlling driving of a first vibration actuator including a first vibrating body and a first contact body in contact with the first vibrating body, and output a second control signal for controlling driving of a second vibration actuator different from the first vibration actuator and including a second vibrating body different from the first vibrating body and a second contact body different from the first contact body, wherein the second contact body is in contact with the second vibrating body, and a driving unit configured to (i) output a first alternating-current voltage in a first plurality of phases, set based on the first control signal, for driving the first vibration actuator, and (ii) output a second alternating-current voltage in a second plurality of phases, set based on the second control signal, for driving the second vibration actuator, wherein the control unit individually sets a phase difference of the first alternating-current voltage and a phase difference of the second alternating-current voltage or a voltage value of the first alternating-current voltage and a voltage value of the second alternating-current voltage based on the first control signal and the second control signal, respectively, and commonly sets a frequency of the first alternating-current voltage and a frequency of the second alternating-current voltage.

Further features of the present disclosure will become apparent from the following description of exemplary embodiments with reference to the attached drawings.

BRIEF DESCRIPTION OF THE DRAWINGS

FIGS. 18A and 18B are perspective views illustrating a general configuration of an imaging apparatus (an electronic device) according to a seventh exemplary embodiment.

DESCRIPTION OF THE EMBODIMENTS

With reference to the accompanying drawings, exemplary embodiments will be described in detail below. In the following description, a "vibration driving apparatus" includes a "vibration actuator" and a "control device". The "vibration actuator" includes a "vibrating body" and a "contact body". The "vibrating body" includes an "elastic body" and an "electro-mechanical energy conversion element".

Figure 15A:
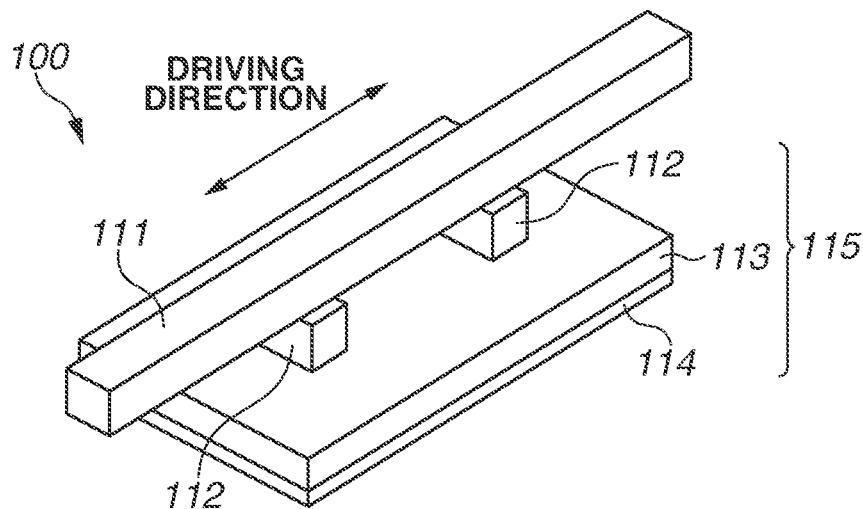
FIG. 15A is a perspective view illustrating a general configuration of the vibration actuator according to the present disclosure.

A first exemplary embodiment will be described below. FIG. 15A is a perspective view illustrating a general configuration of a vibration actuator 100 according to the first exemplary embodiment included in a vibration actuator driving apparatus according to the present disclosure.

The vibration actuator 100 includes a contact body 111 and a vibrating body 115. The vibrating body 115 generally includes an elastic body 113, a piezoelectric element 114, which is an electro-mechanical energy conversion element, and two projection portions 112. The elastic body 113 is a flat plate and is formed of a metal material. The piezoelectric element 114 is joined to one of the surfaces (a first surface) of the elastic body 113. The two projection portions 112 are provided on the other surface (a second surface as the opposite side of the first surface) of the elastic body 113. The contact body 111 and the two projection portions 112 of the vibrating body 115 are in pressure contact with each other by a pressurization method (not illustrated).

Figure 15B:
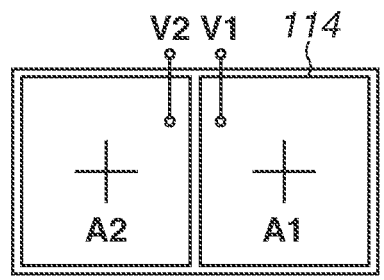
FIG. 15B is a plan view illustrating a general structure of a piezoelectric element included in a vibrating body.
Figure 15C:
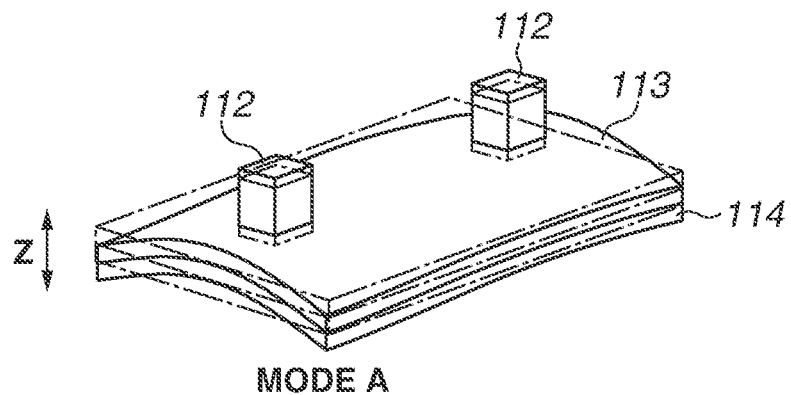
FIGS. 15C and 15D are each an explanation diagram illustrating a vibration mode in which an elastic body included in the vibrating body is excited.
Figure 15D:
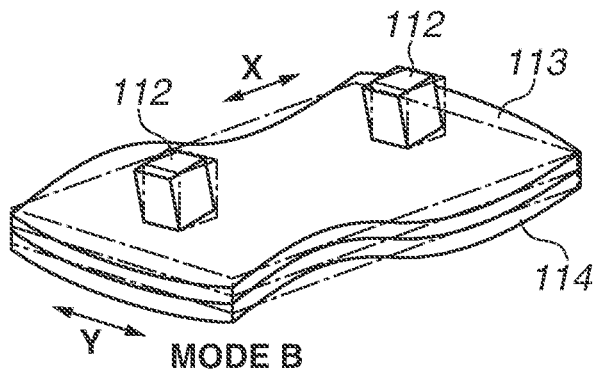

FIG. 15B is a plan view illustrating a general structure of the piezoelectric element 114. FIG. 15C is a diagram illustrating a first vibration mode (hereinafter referred to as a "mode A") in which the vibrating body 115 is excited. FIG. 15D is a diagram illustrating a second vibration mode (hereinafter referred to as a "mode B") in which the vibrating body 115 is excited.

In the vibrating body 115, a direction connecting the two projection portions 112 is defined as an X-direction, the thickness direction of the elastic body 113 is defined as a Z-direction, and a direction orthogonal to the X-direction and the Z-direction is defined as a Y-direction. As illustrated in FIG. 15B, two electrodes divided into two equal parts in the long side direction of the piezoelectric element 114, which is the X-direction, are formed on one of the surfaces of the piezoelectric element 114, and the polarization directions of the electrodes are the same direction (+).

On the other surface of the piezoelectric element 114, a single common electrode (an entire surface electrode) is formed. An alternating voltage V2 is applied to the electrode region on the left side in FIG. 15B, out of the two electrode regions of the piezoelectric element 114, and an alternating voltage V1 is applied to the electrode region on the right side in FIG. 15B. If the alternating voltages V1 and V2 have frequencies near the resonance frequency appearing in the mode A and are alternating voltages in the same phase, the entirety of the piezoelectric element 114 (the two electrode regions) expands at a certain moment and contracts at another moment. As a result, a vibration in the mode A illustrated in FIG. 15C occurs in the vibrating body 115.

If the alternating voltages V1 and V2 have frequencies near the resonance frequency appearing in the mode B and are alternating voltages in phases shifted by 180°, the electrode region on the right side in FIG. 15B in the piezoelectric element 114 contracts and the electrode region on the left side in FIG. 15B expands at a certain moment. The electrode regions have the opposite relationship at another moment.

As a result, a vibration in the mode B illustrated in FIG. 15D occurs in the vibrating body 115. The mode A is a primary out-of-plane bending vibration mode in which two nodes appear approximately parallel to the X-direction in the vibrating body 115. The mode B is a secondary out-of-plane bending vibration mode in which three nodes appear approximately parallel to the Y-direction in the vibrating body 115.

Figure 16A:
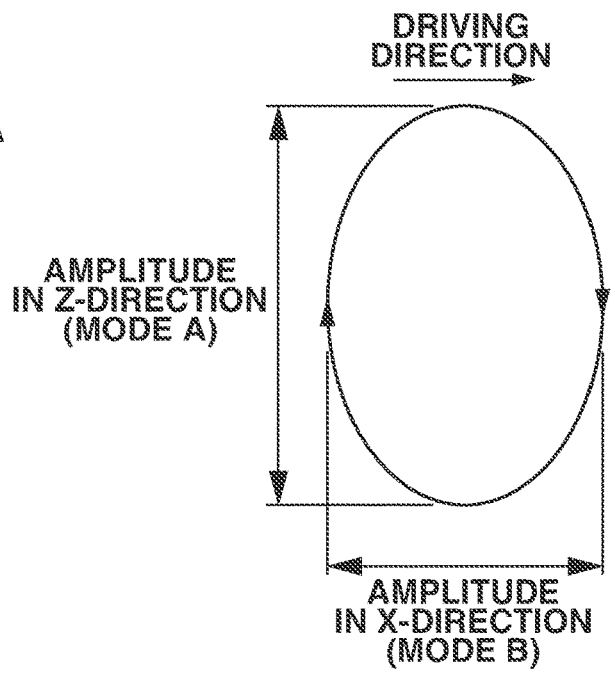
FIG. 16A is a diagram illustrating an elliptical motion to be excited at ends of projection portions included in the vibrating body in FIG. 15A.

FIG. 16A is a diagram illustrating an elliptical vibration excited at the ends of the projection portions 112. The projection portions 112 are arranged near the positions of anti-nodes of the vibration in the mode A and near the positions of nodes of the vibration in the mode B. Thus, the ends of the projection portions 112 make a pendulum motion with nodes of the vibration in the mode A as fulcrums, thus making a reciprocating motion in the X-direction, and also make a reciprocating motion in the Z-direction by the vibration in the mode B. Thus, the vibrating body 115 is excited simultaneously in the modes A and B so that the vibration phase difference between the modes A and B is near ±π/2, and the vibrations are superimposed on each other, so that it is possible to cause the end surfaces of the projection portions 112 to make an elliptical motion in an XZ plane.

At this time, a frictional force due to the pressure contact acts between the two projection portions 112 and the contact body 111. Thus, the elliptical motion of the projection portions 112 generates a driving force (a thrust force) to move the vibrating body 115 and the contact body 111 relative to each other in the X-direction. That is, the projection portions 112 function as a driving unit for moving the contact body 111 relative to the vibrating body 115. In the present exemplary embodiment (FIG. 16A), "moving the contact body relative to the vibrating body" means that the vibrating body is fixed to a member other than the contact body, and the contact body is moved (driven). However, to "move the contact body relative to the vibrating body", the contact body may be fixed to a member other than the vibrating body, and the vibrating body may be moved (driven).

Hereinafter, the ratio between the magnitudes of the amplitude in the Z-direction and the amplitude in the X-direction of the elliptical motion in FIG. 16A generated at the ends of the projection portions 112 is defined as the elliptical ratio of the elliptical motion. In the following description, it is assumed that in the vibration actuator 100, the vibrating body 115 is fixed and the contact body 111 is driven in the X-direction.

Figure 16B:
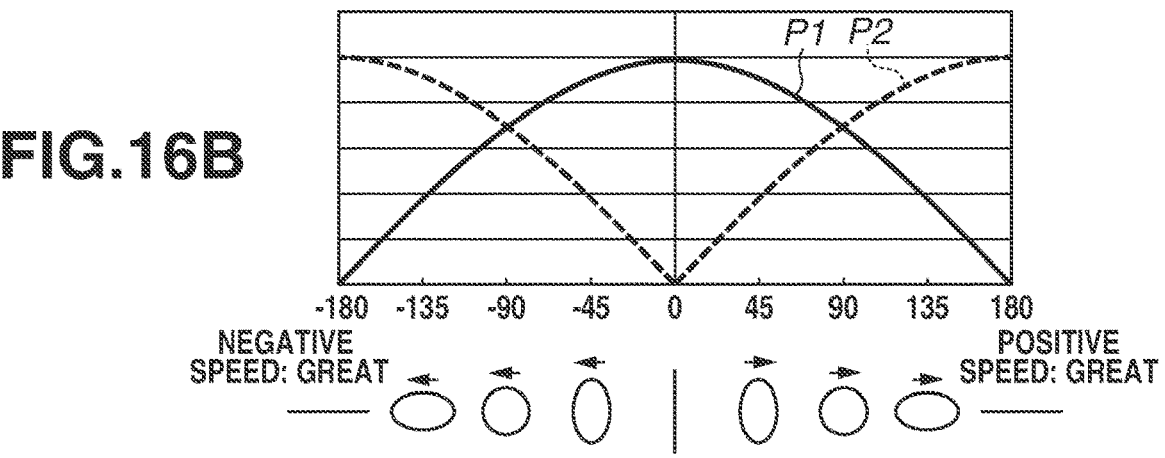
FIG. 16B is a diagram illustrating amplitudes of a first vibration mode and a second vibration mode.

FIG. 16B is a graph illustrating the amplitudes of the first and second vibration modes in a case where the phase difference between the voltages V1 and V2 in two phases (a plurality of phases) is changed from −180 degrees to 180 degrees.

The amplitudes of the first vibration mode (P1) and the second vibration mode (P2) in a case where the phase difference between the alternating-current voltages V1 and V2 in two phases to be applied to two electrodes A1 and A2 of the polarized piezoelectric element 114 is changed from −180 degrees to 180 degrees are indicated as P1 and P2 in FIG. 16B, respectively. In FIG. 16B, the horizontal axis represents the phase difference, and the vertical axis represents the amplitudes of the first and second vibration modes. The combination of the first and second vibration modes excites an elliptical motion in the projection portions 112, and the phase difference between the alternating-current voltages V1 and V2 to be applied is changed, so that it is possible to adjust the elliptical ratio of the elliptical motion excited in a predetermined projection portion 112.

The lower part of FIG. 16B illustrates elliptical shapes corresponding to the phase difference represented by the horizontal axis. The positive or negative sign of the phase difference between the alternating-current voltages V1 and V2 is switched to switch the driving direction of the vibration actuator 100 that is linearly driven. Further, the phase difference is continuously changed from any value, including the positive or negative sign, to continuously change the driving direction (the moving direction of the contact body 111 relative to the vibrating body 115) and the driving speed (the speed of the contact body 111 relative to the vibrating body 115) of the vibration actuator 100. To continuously change the phase difference from any value, including the positive or negative sign, for example, the phase difference is continuously changed from 90 degrees to −90 degrees, including the positive or negative sign.

Figure 16C:
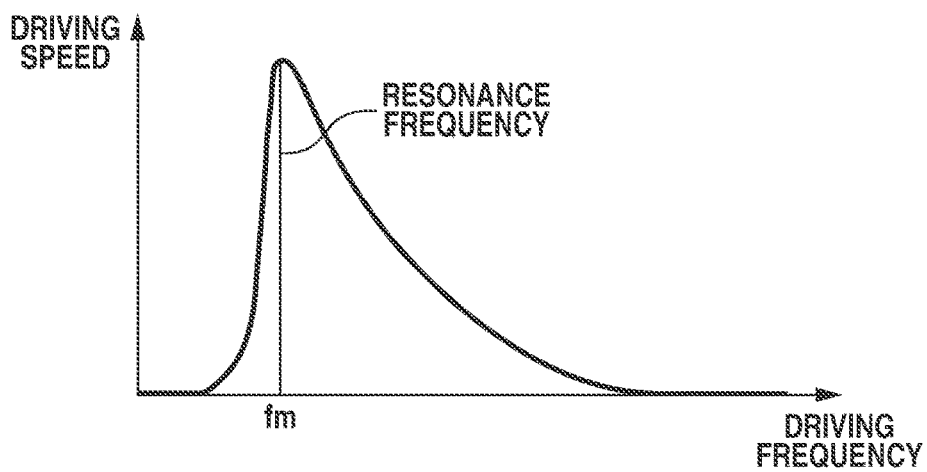
FIG. 16C is a diagram illustrating a relationship between the driving frequency and the driving speed of the vibration actuator.

FIG. 16C is a diagram illustrating the relationship between the driving frequency and the driving speed (the speed of the contact body 111 relative to the vibrating body 115) (such a relationship is also referred to as the driving characteristic) of the vibration actuator 100. In a case where the vibration actuator 100 is driven at the resonance frequency (fm) of the vibration actuator 100, the driving speed reaches a peak. At frequencies higher than the resonance frequency (fm), the driving speed gently decreases. At frequencies lower than the resonance frequency (fm), a phenomenon that the driving speed rapidly decreases (hereinafter referred to as a "cliff drop phenomenon") occurs. In response, the driving frequency of the piezoelectric element 114 is changed, so that it is possible to change the magnitudes of the elliptical vibration while maintaining the elliptical ratio. For example, the driving frequency is brought close to the resonance frequency of the vibration actuator 100, thus making the elliptical vibration large and increasing the driving speed.

In contrast, the driving frequency of each alternating-current voltage to be applied is distanced from the resonance frequency of the vibration actuator 100, thus making the elliptical vibration small and decreasing the driving speed. The driving frequency is fixed and the elliptical ratio is changed as illustrated in FIG. 16B, so that it is possible to control the driving speed. In this way, the magnitudes and the elliptical ratio of the elliptical vibration are changed by the driving frequency and the phase difference, so that it is possible to control a wide range of driving speeds from low speed to high speed.

In the exemplary embodiments, a description will be provided of a camera lens mechanism in which vibration actuators 100 illustrated in FIG. 15A are used as a plurality of driving sources. Normally, a lens mechanism used in a digital video camera or a digital camera includes a plurality of lens groups. The plurality of lens groups includes a lens group fixed to a lens barrel and a lens group movable relative to the lens barrel. In a known digital video camera or digital camera, the focus can be adjusted by moving a predetermined lens group in the optical axis direction. The zoom magnification can be changed by moving a predetermined lens group different from the above lens group in the optical axis direction.

Figure 17:
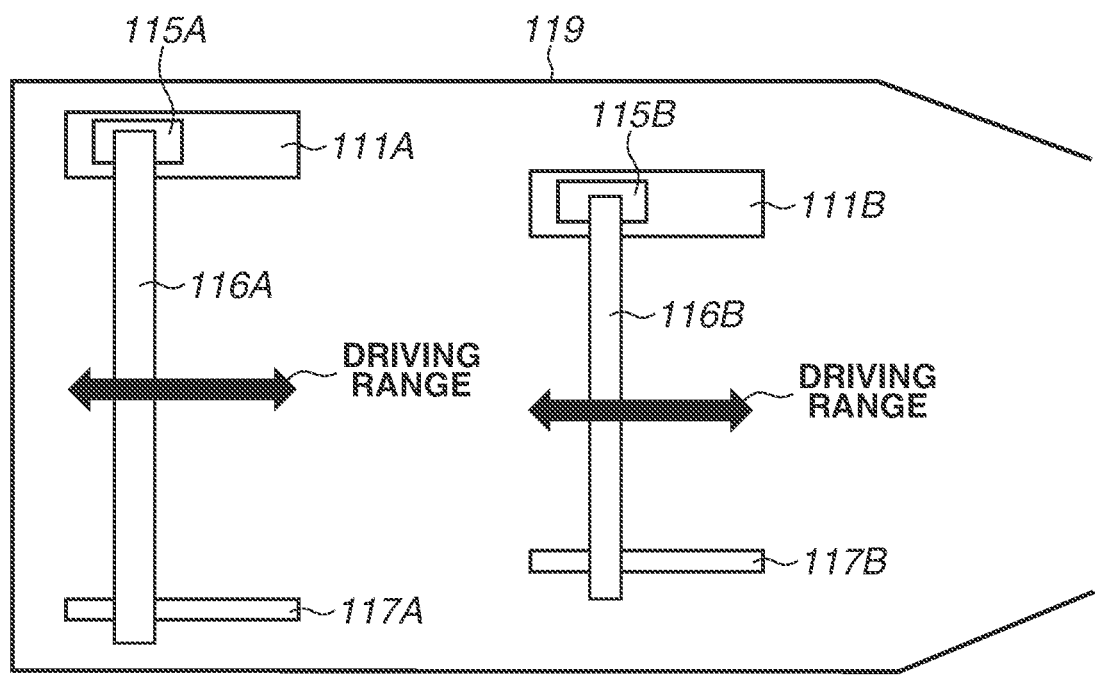
FIG. 17 is a diagram illustrating a general structure of a part of a lens driving mechanism including the vibration driving apparatus according to the first exemplary embodiment.

FIG. 17 illustrates a lens mechanism including a plurality of lens groups as described above and used in an interchangeable lens imaging apparatus or a lens integrated imaging apparatus. For ease of description, components other than a focus adjustment lens and a zoom magnification adjustment lens are not illustrated. A mechanism such as a diaphragm required in the lens mechanism is not illustrated or described, either.

In FIG. 17, a lens barrel 119 includes a lens for focus adjustment (not illustrated), a lens holding member A 116A (a first driving target member) that holds the lens, a guide shaft A 117A, a vibrating body A 115A, and a contact body A 111A in contact with the vibrating body A 115A. The lens barrel 119 includes a lens for zoom adjustment (not illustrated), a lens holding member B 116B that holds the lens, a guide shaft B 117B, a vibrating body B 115B, and a contact body B 111B (a second driving target member) in contact with the vibrating body B 115B. The lens for focus adjustment and the lens for zoom adjustment are not illustrated, but are actually attached to the lens holding member A 116A and the lens holding member B 116B, respectively.

The guide shaft A 117A and the guide shaft B 117B are fitted to holes formed in the lens holding member A 116A and the lens holding member B 116B and restrict the motion directions of the lens holding member A 116A and the lens holding member B 116B, respectively. Although not illustrated, a driving force transmission member is provided between a lens holding member and a vibration actuator including a vibrating body and a contact body. A driving force transmission member functions to transmit the power of a vibration actuator A 100A (a first vibration actuator) including the vibrating body A 115A (a first vibrating body) and the contact body A 111A (a first contact body) to the lens holding member A 116A. A driving force transmission member functions to transmit the power of a vibration actuator B 100B (a second vibration actuator) including the vibrating body B 115B (a second vibrating body) and the contact body B 111B (a second contact body) to the lens holding member B 116B.

Figure 1:
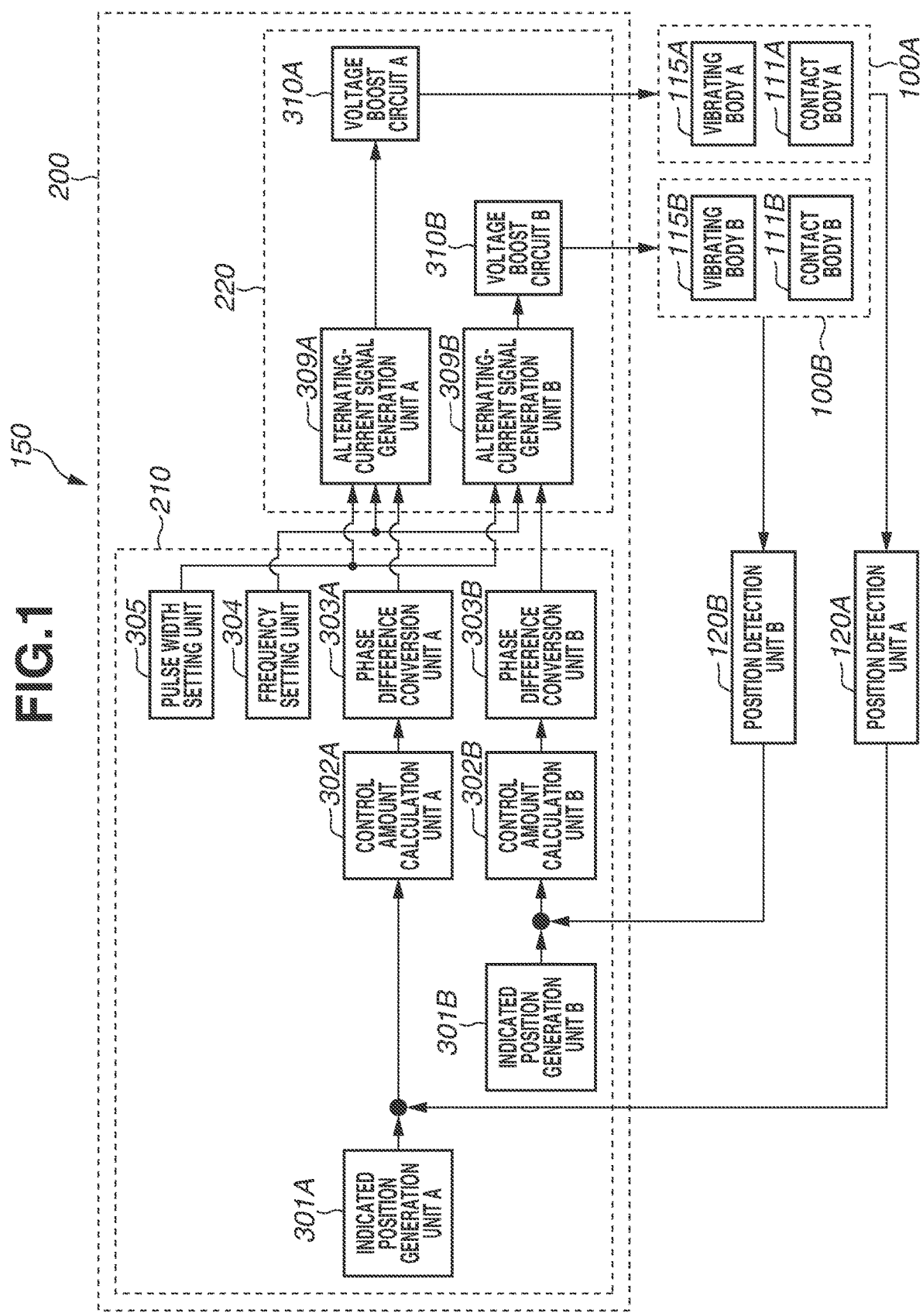
FIG. 1 is a block diagram illustrating a general configuration of a vibration driving apparatus according to a first exemplary embodiment.

FIG. 1 is a block diagram illustrating a general configuration of a vibration driving apparatus 150 including a control device 200 that simultaneously performs driving control of the vibration actuator A 100A and the vibration actuator B 100B. The vibration actuator 100 (the vibrating body 115 and the contact body 111) has been described in conjunction with FIGS. 15A to 15D, and thus a description thereof is omitted here.

The vibration driving apparatus 150 includes the control device 200, the vibration actuator A 100A, the vibration actuator B 100B, a position detection unit A 120A, and a position detection unit B 120B. The control device 200 includes a control unit 210 and a driving unit 220. The control unit 210 outputs control signals. Specifically, the control unit 210 outputs a first control signal serving as a control signal for controlling the driving of the vibration actuator A 100A, and a second control signal serving as a control signal for controlling the driving of the vibration actuator B 100B. The driving unit 220 outputs a first alternating-current signal (a first alternating-current voltage) that is set based on the first control signal output from the control unit 210 and serves as a driving signal for driving the vibration actuator A 100A. The driving unit 220 outputs a second alternating-current signal (a second alternating-current voltage) that is set based on the second control signal output from the control unit 210 and serves as a driving signal for driving the vibration actuator B 100B.

The control unit 210 includes an indicated position generation unit A 301A (a first position indication unit) and an indicated position generation unit B 301B (a second position indication unit). The control unit 210 includes a control amount calculation unit A 302A, a control amount calculation unit B 302B, a phase difference conversion unit A 303A, a phase difference conversion unit B 303B, a frequency setting unit 304, and a pulse width setting unit 305. The driving unit 220 includes an alternating-current signal generation unit A 309A, an alternating-current signal generation unit B 309B, a voltage boost circuit A 310A serving as a voltage boost unit, and a voltage boost circuit B 310B serving as a voltage boost unit. The control unit 210 is a microcomputer and includes electric components, such as an arithmetic device (a central processing unit (CPU)), a memory that stores a program, and a memory as a work area into which a program is loaded. The control unit 210 generates signals (control signals) having information for controlling the driving of the vibration actuator A 100A and the vibration actuator B 100B.

Each of the position detection unit A 120A and the position detection unit B 120B is, for example, an encoder. The position detection unit A 120A detects the relative position of the contact body A 111A (the position of the contact body A 111A relative to the vibrating body A 115A). The position detection unit B 120B detects the relative position of the contact body B 111B (the position of the contact body B 111B relative to the vibrating body B 115B). The indicated position generation unit A 301A generates an indicated position A for moving the contact body A 111A. The indicated position generation unit B 301B generates an indicated position B for moving the contact body B 111B.

A signal regarding the difference (a deviation A) between the indicated position A, which is an output from the indicated position generation unit A 301A, and an output from the position detection unit A 120A (a detected position A) is input to the control amount calculation unit A 302A. A signal regarding the difference (a deviation B) between the indicated position B, which is an output from the indicated position generation unit B 301B, and an output (a detected position B) from the position detection unit B 120B is input to the control amount calculation unit B 302B. An "indicated position" is the relative position of a contact body generated by an indicated position generation unit. A "detected position" is the relative position of a contact body detected by a position detection unit.

Both the indicated positions A and B refer to target positions that change with time. The indicated position A is set to perform position control to move the contact body A 111A to a final stop position. The indicated position B is set to perform position control to move the contact body B 111B to a final stop position. For example, each of the indicated positions A and B is set based on the combination of an acceleration period during which the driving speed of the vibration actuator (the speed of the contact body relative to the vibrating body) is accelerated, a constant-velocity period during which the driving speed is maintained, and a deceleration period during which the driving speed is decelerated. The combination, however, is not limited to this, and each of the indicated positions A and B may be set based on the combination of the acceleration period and the deceleration period.

The control amount calculation unit A 302A calculates a control amount of the vibrating body A 115A. The control amount calculation unit B 302B calculates a control amount of the vibrating body B 115B. A "control amount" is an amount of control of a driving amount as a target (a target driving amount) or a driving speed as a target (a target speed). The absolute value of the control amount and the target driving amount or the target speed of the vibration actuator are proportional to each other. The control amount output from the control amount calculation unit A 302A is input to the phase difference conversion unit A 303A. The control amount output from the control amount calculation unit B 302B is input to the phase difference conversion unit B 303B.

The phase difference conversion unit A 303A converts the control amount acquired from the control amount calculation unit A 302A into a phase difference, thus determining the elliptical ratio of the elliptical motion to be excited at the projection portions 112 of the vibrating body A 115A. The phase difference conversion unit B 303B converts the control amount acquired from the control amount calculation unit B 302B into a phase difference, thus determining the elliptical ratio of the elliptical motion to be excited at the projection portions 112 of the vibrating body B 115B. In other words, the phase difference of a first alternating-current voltage and the phase difference of a second alternating-current voltage are individually set based on first and second control signals, respectively.

The phase difference converted by the phase difference conversion unit A 303A (the phase difference of the first alternating-current voltage) is the phase difference of an alternating-current voltage VA (the first alternating-current voltage) to be applied to the piezoelectric element 114 included in the vibrating body A 115A. The phase difference converted by the phase difference conversion unit B 303B (the phase difference of the second alternating-current voltage) is the phase difference of an alternating-current voltage VB (the second alternating-current voltage) to be applied to the piezoelectric element 114 included in the vibrating body B 115B.

A limit value is set for the phase differences. If either of the phase differences is out of the range of the limit value, the phase difference is to be set to the limit value. This value is set within the range of ±90 degrees. The present disclosure, however, is not limited to this. Alternatively, the limit value may be set within the range of another value, such as ±80 degrees or ±100 degrees. This will be described in detail in a second exemplary embodiment.

The frequency setting unit 304 commonly sets the driving frequencies of the vibrating body A 115A and the vibrating body B 115B (commonly sets the frequency of the first alternating-current voltage and the frequency of the second alternating-current voltage), thus determining the sizes of the ellipses of the elliptical motions to be excited at the projection portions 112. The pulse width setting unit 305 commonly sets the pulse widths of the vibrating body A 115A and the vibrating body B 115B. Consequently, the pulse width setting unit 305 commonly sets the voltage value of the first alternating-current voltage and the voltage value of the second alternating-current voltage, thus determining the sizes of the ellipses of the elliptical motions to be excited at the projection portions 112 of the vibrating body A 115A and the vibrating body B 115B. At this time, each of the voltage value of the first alternating-current voltage and the voltage value of the second alternating-current voltage to be set may be any of the maximum value, the root mean square value, and the average value of the alternating-current voltage.

An output from the phase difference conversion unit A 303A, an output from the frequency setting unit 304, and an output from the pulse width setting unit 305 forms a first control signal and are input as the first control signal to the alternating-current signal generation unit A 309A. An output from the phase difference conversion unit B 303B, an output from the frequency setting unit 304, and an output from the pulse width setting unit 305 forms a second control signal and are input as the second control signal to the alternating-current signal generation unit B 309B. Each of the alternating-current signal generation unit A 309A and the alternating-current signal generation unit B 309B is, for example, a driver circuit which generates an alternating-current signal by switching.

Figure 2A:
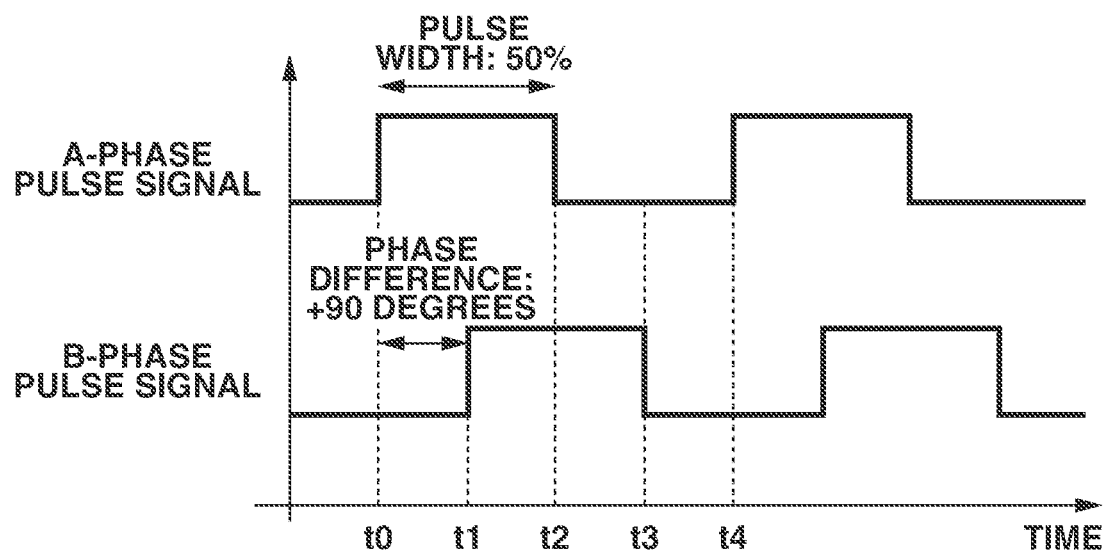
FIGS. 2A and 2B are diagrams illustrating pulse widths of alternating-current signals (pulse signals) output from alternating-current signal generation units included in a control device of the vibration driving apparatus according to the present disclosure.
Figure 2B:
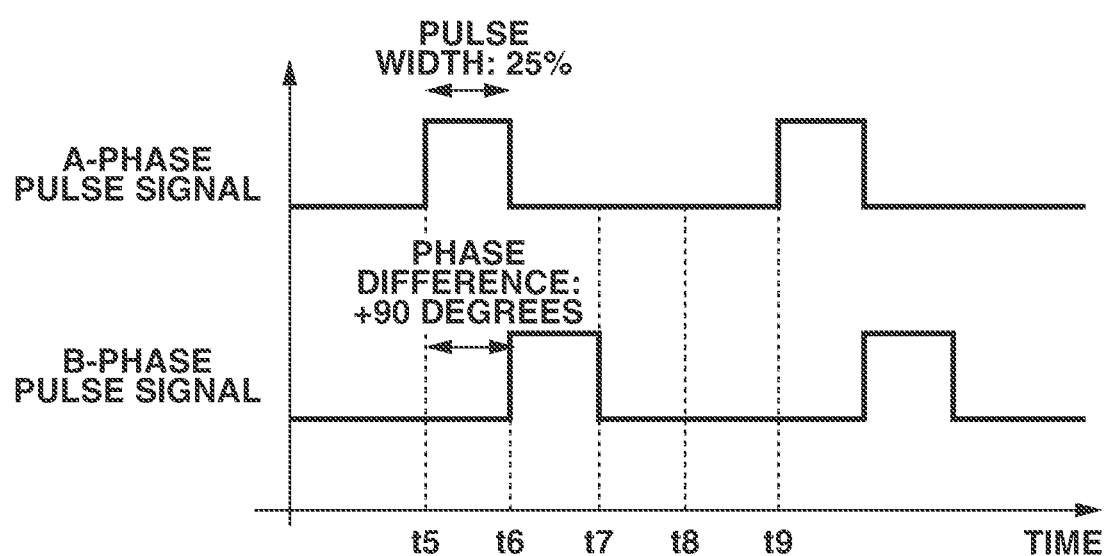

Referring now to FIGS. 2A and 2B, the pulse widths of the alternating-current signals output from the alternating-current signal generation unit A 309A and the alternating-current signal generation unit B 309B will be described.

FIG. 2A illustrates changes over time in an A-phase pulse signal (a first pulse signal) and a B-phase pulse signal (a second pulse signal) in a case where the pulse widths of the pulse signals are 50%. FIG. 2A includes clock times t0, t1, t2, t3, and t4. The period between clock times t0 and t4 corresponds to one cycle of the driving frequency for driving the vibration actuator 100, and each of the A-phase pulse signal and the B-phase pulse signal is a pulse signal output at a high level during time corresponding to 50% of one cycle (the pulse width). That is, both a first pulse width which is the pulse width of the first pulse signal and a second pulse width which is the pulse width of the second pulse signal are 50% of one cycle. In a case where the phase difference between the A-phase pulse signal and the B-phase pulse signal is +90 degrees, the A-phase pulse signal and the B-phase pulse signal are output so that the leading edges of the A-phase pulse signal and the B-phase pulse signal are shifted by a ¼ cycle (the clock time t0 and a clock time t1).

FIG. 2B illustrates changes over time in the A-phase pulse signal and the B-phase pulse signal in a case where the pulse widths of the pulse signals are 25% of one cycle. FIG. 2B includes clock times t5, t6, t7, t8, and t9. The period between clock times t5 and t9 is one cycle of the driving frequency for driving the vibration actuator 100, and each of the A-phase pulse signal and the B-phase pulse signal is a pulse signal output at a high level during time corresponding to 25% of one cycle. In a case where the phase difference between the A-phase pulse signal and the B-phase pulse signal is +90 degrees, the A-phase pulse signal and the B-phase pulse signal are output so that the leading edges of the A-phase pulse signal and the B-phase pulse signal are shifted by a ¼ cycle (the clock time t5 and a clock time t6).

Figure 3:
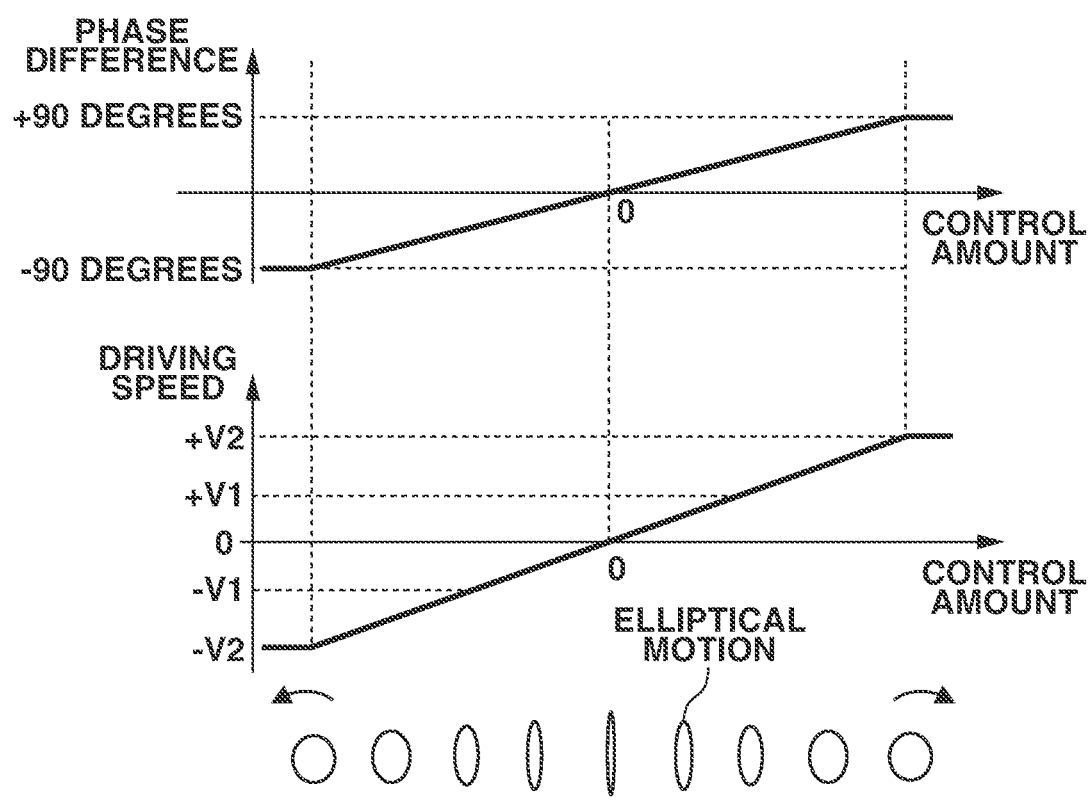
FIG. 3 is a diagram illustrating a relationship between a control amount output from a control amount calculation unit and a phase difference which is controlled based on the control amount, and a relationship between the control amount output from the control amount calculation unit and a driving speed of a vibration actuator, according to the first exemplary embodiment.

FIG. 3 illustrates the relationship between a control amount output from a control amount calculation unit and a phase difference controlled based on the control amount. FIG. 3 also illustrates the relationship between the control amount output from the control amount calculation unit and the driving speed of the vibration actuator. Specifically, the "control amount" in FIG. 3 is a control amount (a first control amount or a second control amount) output from the control amount calculation unit A 302A (a first control amount calculation unit) or the control amount calculation unit B 302B (a second control amount calculation unit). The "phase difference" in FIG. 3 is a phase difference controlled based on the control amount. The "driving speed" in FIG. 3 is a driving speed controlled based on the control amount. The driving speed is obtained by a position detection unit based on a change in a detected position. To obtain the driving speed, a speed detection unit may be provided.

The control amount output from the control amount calculation unit A 302A is controlled by changing the phase difference of a driving voltage VA (a first alternating-current voltage), which is an alternating-current voltage in two phases (a first plurality of phases) for driving the vibration actuator A 100A. The control amount output from the control amount calculation unit B 302B is controlled by changing the phase difference of a driving voltage VB (a second alternating-current voltage), which is an alternating-current voltage in two phases (a second plurality of phases) for driving the vibration actuator B 100B.

Outputs from the alternating-current signal generation unit A 309A and the alternating-current signal generation unit B 309B are input to the voltage boost circuit A 310A and the voltage boost circuit B 310B, respectively. Each of the voltage boost circuit A 310A and the voltage boost circuit B 310B includes, for example, a coil and a transformer. The present disclosure, however, is not limited to this. Alternatively, each of the voltage boost circuit A 310A and the voltage boost circuit B 310B may include only either one of a coil and a transformer. The voltage boost circuit A 310A and the voltage boost circuit B 310B boost the voltages of alternating-current signals in two phases (a plurality of phases) generated by switching by the alternating-current signal generation unit A 309A and the alternating-current signal generation unit B 309B, respectively, and apply the voltages to the electrodes of the piezoelectric elements 114.

Figure 4A:
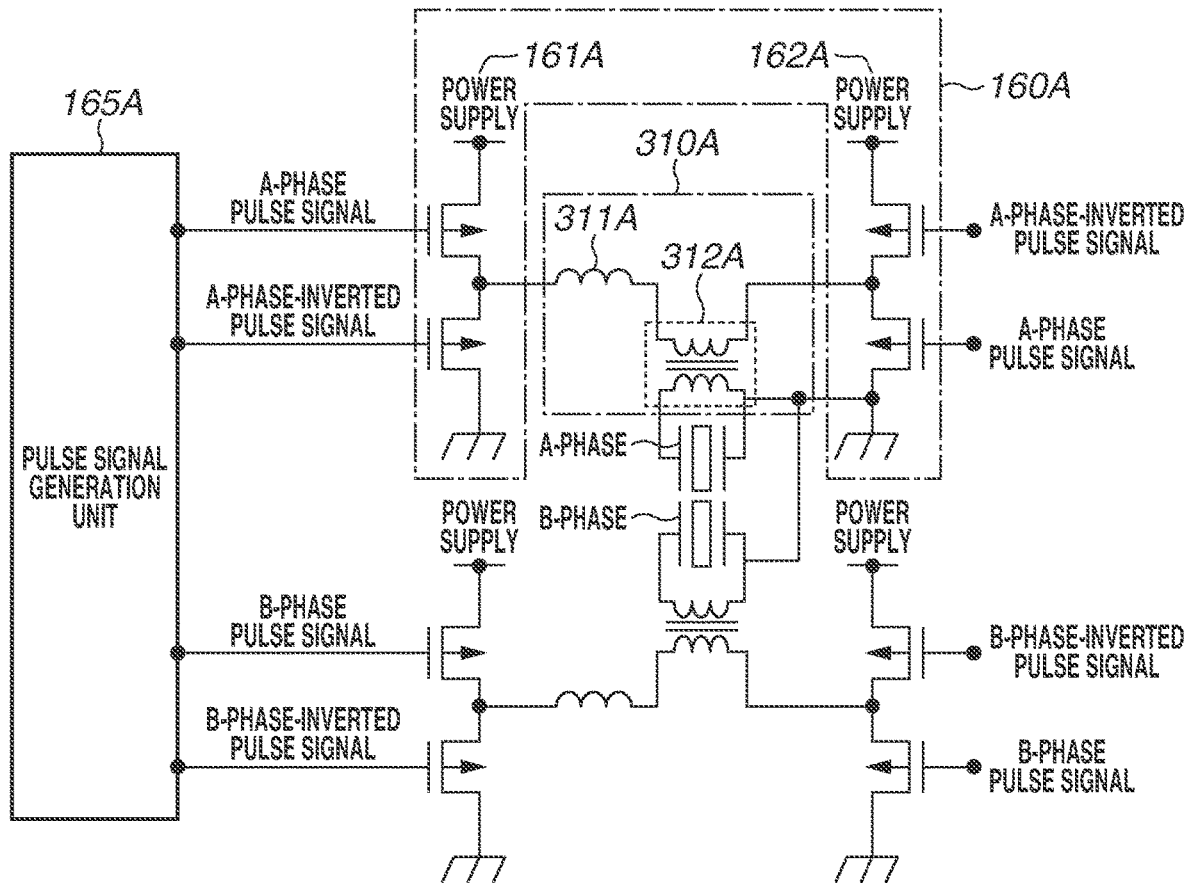
FIG. 4A is a block diagram illustrating a general configuration of a driving unit included in the control device forming the vibration driving apparatus according to the present disclosure, and 4B is a diagram illustrating pulse signals generated by a pulse signal generation unit.
Figure 4B:
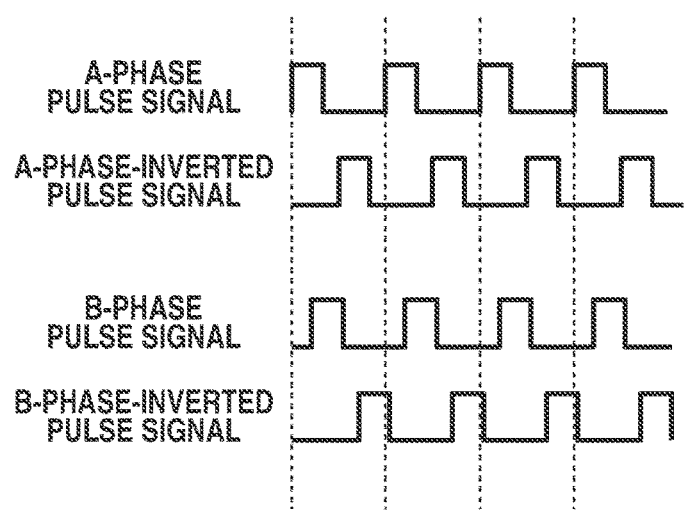

Referring now to FIGS. 4A and 4B, the configuration of the driving unit 220 will be described in detail. In the driving unit 220, the configurations of portions used to generate the driving voltages V1 and V2 to be applied to the piezoelectric elements 114 are similar to each other, and thus, only the portion used to generate the driving voltage V1 will be described. Further, only the alternating-current signal generation unit A 309A and the voltage boost circuit A 310A will be described here, and the alternating-current signal generation unit B 309B and the voltage boost circuit B 310B, each of which has a configuration similar to those of the alternating-current signal generation unit A 309A and the voltage boost circuit A 310A, respectively, are omitted.

FIG. 4A is a block diagram illustrating general configurations of the alternating-current signal generation unit A 309A and the voltage boost circuit A 310A. The alternating-current signal generation unit A 309A includes a pulse signal generation unit 165A and a switching circuit 160A. The voltage boost circuit A 310A includes a coil 311A and a transformer 312A. The pulse signal generation unit 165A generates a rectangular A-phase pulse signal having information regarding the phase difference and the frequency in accordance with information from the phase difference conversion unit A 303A and/or the frequency setting unit 304, and an A-phase-inverted pulse signal of which the phase is shifted by 180 degrees from that of the A-phase pulse signal.

FIG. 4B is a diagram illustrating the pulse signals generated by the pulse signal generation unit 165A. The A-phase pulse signal and the A-phase-inverted pulse signal generated by the pulse signal generation unit 165A are input to the switching circuit 160A. The switching circuit 160A causes a first direct-current voltage supplied from the first power supply 161A and a second direct-current voltage supplied from the second power supply 162A to perform a switching operation at the timings of the input pulse signals, thus generating an alternating-current signal of a square wave. A power supply may be commonly used in the driving unit 220.

If the pulse widths of the pulse signals generated by the pulse signal generation unit 165A are represented by a duty cycle, the pulse width of the alternating-current signal generated by the alternating-current signal generation unit A 309A is also represented by the same duty cycle. The alternating-current signal output from the alternating-current signal generation unit A 309A is input to the voltage boost circuit A 310A, and the voltage of the alternating-current signal is boosted to a predetermined voltage value, thus being converted into a driving voltage V1 of a sine wave. The driving voltage V1 is then applied to one of the electrodes (the A-phase) of the piezoelectric element 114.

A B-phase pulse signal used to generate a driving voltage V2 to be applied to the other electrode (the B-phase) of the piezoelectric element 114 is generated to have a predetermined phase difference based on information regarding the phase difference output from the phase difference conversion unit A 303A, from the A-phase pulse signal. A B-phase-inverted pulse signal is generated so that the phase of the B-phase-inverted pulse signal is shifted by 180 degrees from that of the B-phase pulse signal. A driving voltage V2 of a sine wave is generated in a manner similar to the driving voltage V1.

Figure 5:
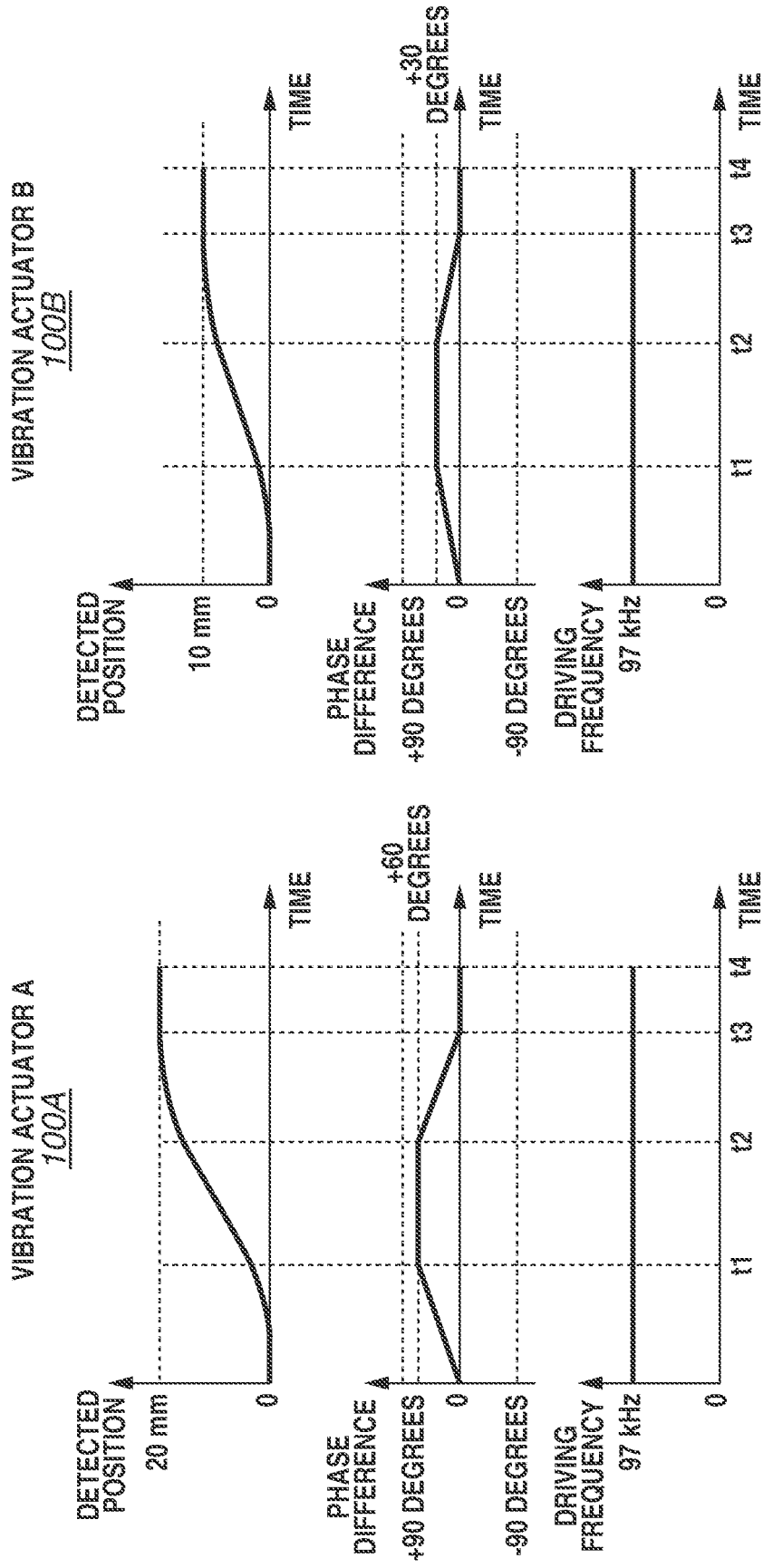
FIG. 5 is a diagram illustrating relationships between parameters in a case where position control is performed, according to the first exemplary embodiment.

FIG. 5 illustrates examples of the relationships between time and the current position (the detected position), the phase difference, and the driving frequency (such relationships are also referred to as the driving characteristics) of each of the vibration actuator A 100A and the vibration actuator B 100B. In FIG. 5, different lenses in multiple lens groups are moved in synchronization with each other at different driving speeds based on the mechanism diagram in FIG. 17. For example, FIG. 5 illustrates an example of a case where the target stop positions of the vibration actuators are different from each other, driving control is performed so that the vibration actuator A 100A is moved to a target stop position of 20 mm, and the vibration actuator B 100B is moved to a target stop position of 10 mm.

As illustrated in FIG. 5, the driving frequencies (97 kHz) of the vibration actuator A 100A and the vibration actuator B 100B are commonly set, and the phase differences are controlled within the range of −90 degrees to +90 degrees. If the driving of the vibration actuator A 100A is started, the phase difference is changed in accordance with the deviation between the indicated position and the current position (the detected position) and gradually increased until a time t1. The phase difference is controlled at near 60 degrees until a time t2 and gradually decreased until a time t3, and the driving control ends at a time t4. On the other hand, the target stop position of the vibration actuator B 100B is closer than that of the vibration actuator A 100A, and the amount of change in the indicated position per time of the vibration actuator B 100B is smaller than that of the vibration actuator A 100A, and thus, the phase difference is controlled at near 30 degrees from the time t1 to the time t2.

In this way, a plurality of vibration actuators is controlled based on commonly set driving frequencies and phase differences individually set in accordance with the deviation between an indicated position and a current position (a detected position). This enables driving control suitable for driving conditions and motor characteristics (driving characteristics) even in a case where the target stop positions of the plurality of vibration actuators are different from each other.

In a case where the target stop positions are different from each other as described above, a stop command may be output first from either the vibration actuator A 100A or the vibration actuator B 100B. At this time, it is desirable that the driving control of the vibration actuator from which the stop command has been output should end first. However, the driving control may be continued until stop commands are output from both of the vibration actuators, and then, the driving control may end.

With a configuration as described above, it is possible to perform driving control without producing a beat note even in a case where the target stop positions and/or the driving speeds of a plurality of vibration actuators are different from each other.

A second exemplary embodiment of the preset disclosure will be described below. In the second exemplary embodiment, a description will be provided of a control method in a case where, in the first exemplary embodiment, either of the phase differences of a plurality of vibration actuators goes out of the range of a phase difference limit value, which is a predetermined limit value, and thus is set to the phase difference limit value, or both of the phase differences of the plurality of vibration actuators go out of the ranges of phase difference limit values, which is predetermined limit values, and thus are set to the phase difference limit values, and the maximum driving speeds cannot be increased.

Figure 6:
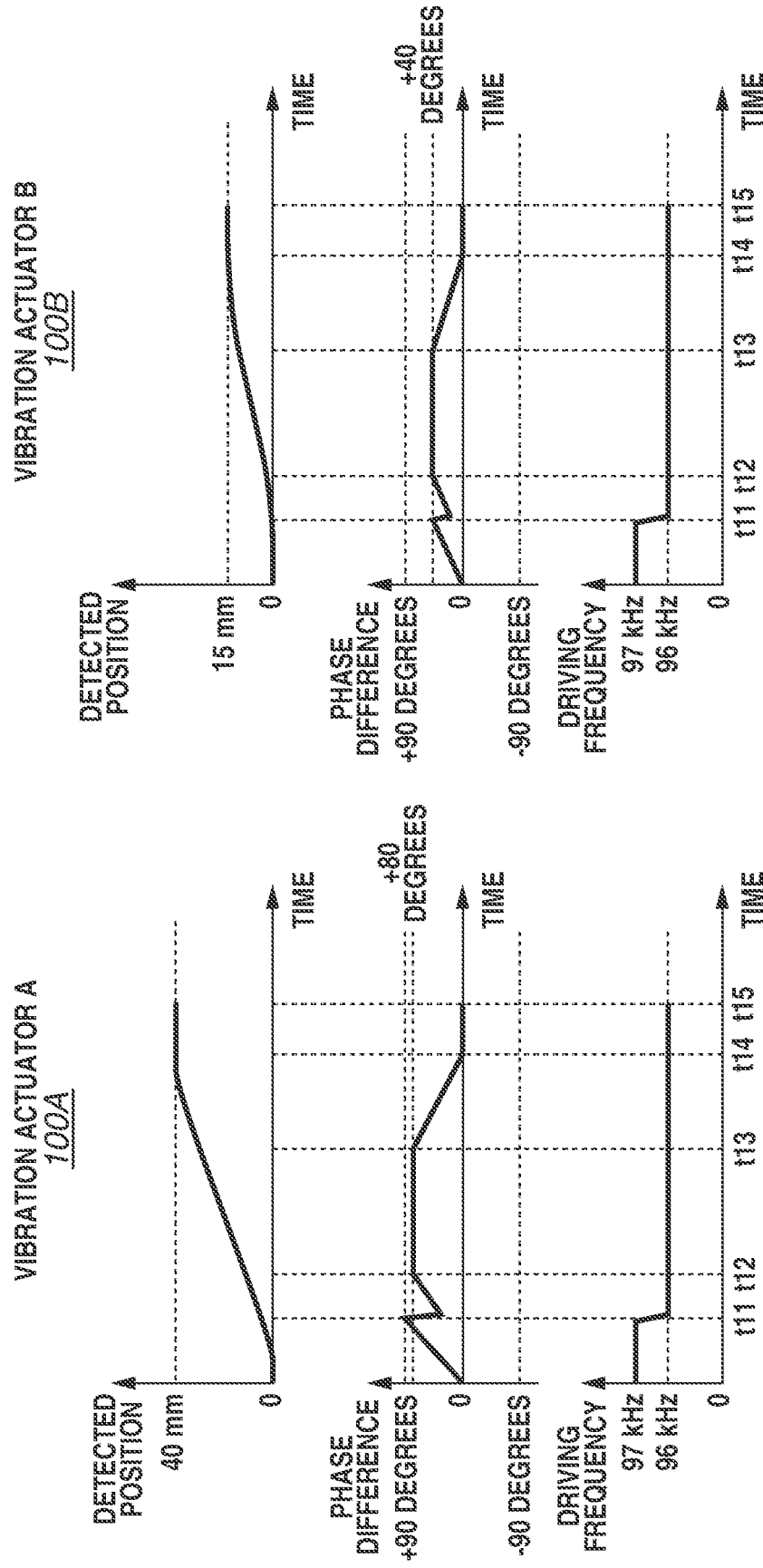
FIG. 6 is a diagram illustrating relationships between parameters in a case where position control is performed, according to a second exemplary embodiment.

FIG. 6 illustrates examples of the relationships between time and the current position (the detected position), the phase difference, and the driving frequency (such relationships are also referred to as the driving characteristics) of each of the vibration actuator A 100A and the vibration actuator B 100B. FIG. 6 illustrates, for example, the relationships between time and the current position (the detected position), the phase difference, and the driving frequency when the vibration actuator A 100A and the vibration actuator B 100B are driven with the target stop position of the vibration actuator A 100A 40 mm and the target stop position of the vibration actuator B 100B 15 mm.

As illustrated in FIG. 6, if the driving of the vibration actuator A 100A is started, the phase difference is changed in accordance with the deviation between the indicated position and the current position (the detected position). At a time t11, however, the phase difference exceeds 90 degrees, which is a phase difference limit value, and thus, the phase difference is set to 90 degrees, so that the speed cannot be increased any further and the vibration actuator A 100A cannot follow the indicated position. Thus, to increase the maximum speed based on control of the phase difference, the frequency setting unit 304 changes the driving frequency from 97 kHz to 96 kHz at the time tn. A description will now be provided of the relationship between the driving frequency and the driving speed in a case where the phase difference is the phase difference limit value with reference to FIG. 7.

Figure 7:
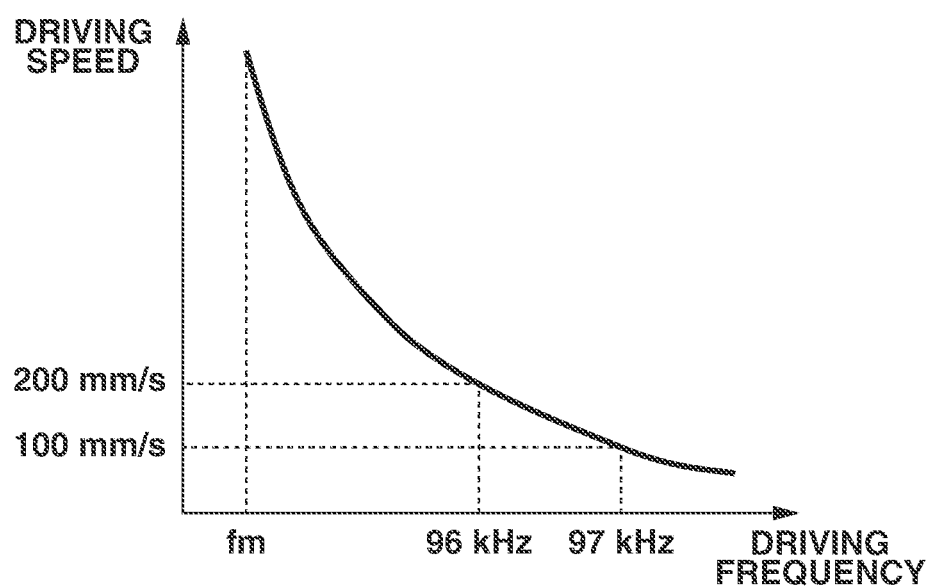
FIG. 7 is a diagram illustrating a relationship between a driving frequency and a driving speed of a vibration actuator according to the present disclosure.

As illustrated in FIG. 7, for example, if the driving frequency is 97 kHz, the driving speed is 100 mm/s. If the driving frequency is 96 kHz, the driving speed is 200 mm/s. Thus, the driving frequency is changed to the resonance frequency (fm) side. This can increase the maximum driving speed based on control of the phase difference. The phase difference is increased based on the control amount until a time t12. The phase difference is controlled at near 80 degrees until a time t13. The phase difference is gradually decreased until a time t14. The driving control ends at a time t15.

In contrast, the phase difference is changed until the time t11 in accordance with the deviation between the indicated position and the current position (the detected position). Here, even if the phase difference falls within the range of a phase difference limit value, the driving frequency is changed from 97 kHz to 96 kHz simultaneously with the vibration actuator A 100A at the timing of the time tn. The phase difference is then increased based on the control amount until the time t12. The phase difference is controlled at near 40 degrees until the time t13. The phase difference is gradually decreased until the time t14. The driving control ends at the time t15.

In this way, in a case where a control amount of either of the phase differences of a plurality of vibration actuators goes out of the range of a phase difference limit value and is set to the phase difference limit value, or control amounts of both of the phase differences of the plurality of vibration actuators go out of the ranges of phase difference limit values and are set to the phase difference limit values, common driving frequencies are changed to the resonance frequency (fm) side. Consequently, it is possible to control the phase differences within the ranges of the phase difference limit values.

Figure 20:
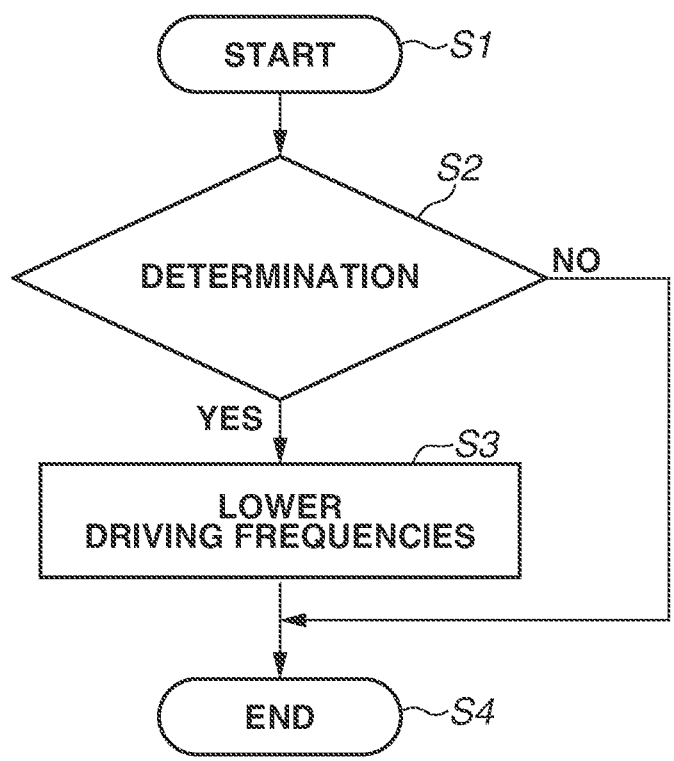
FIG. 20 is a flowchart for determining whether driving frequencies are to be lowered when the driving frequencies are commonly set by a control unit according to the present disclosure.

Instead of determining whether the control amount of either of the phase differences of the vibration actuator A 100A and the vibration actuator B 100B goes out of the range of a phase difference limit value, or the control amounts of both of the phase differences of the vibration actuator A 100A and the vibration actuator B 100B go out of the ranges of phase difference limit values as described above, whether or not the driving speeds are smaller than target speeds may be determined. Specifically, this method is as follows. FIG. 20 is a flowchart for determining whether the driving frequencies are to be lowered in commonly setting the driving frequencies in the control unit according to the present disclosure.

The control unit limits the range in which the phase difference of the first alternating-current voltage is set to a first phase difference limit value, which is a predetermined limit value, and limits the range in which the phase difference of the second alternating-current voltage is set to a second phase difference limit value, which is a predetermined limit value. To limit the ranges in which the phase differences are set, the limit values may be set in advance, or may be appropriately set by an input from outside.

In step S1 in FIG. 20, in commonly setting the driving frequencies, the control unit starts determining whether the driving frequencies are to be lowered. In step S2 in FIG. 20, if the phase difference of the first alternating-current voltage is the first phase difference limit value, it is determined whether a first driving speed, which is the speed of the first contact body relative to the first vibrating body, is smaller than a first target speed, which is as a target driving speed.

If the phase difference of the second alternating-current voltage is the second phase difference limit value, it is determined whether a second driving speed, which is the speed of the second contact body relative to the second vibrating body, is smaller than a second target speed, which is a target driving speed.

If it is determined that at least either the first driving speed is smaller than the first target speed or the second driving speed is smaller than the second target speed (YES in step S2 in FIG. 20), then in step S3 in FIG. 20, the driving frequencies are lowered when the driving frequencies are commonly set. In step S4 in FIG. 20, when the driving frequencies are commonly set, the control unit ends the determination as to whether the driving frequencies are to be lowered.

In a fourth exemplary embodiment described below, either of the first and second pulse widths may go out of the range of a pulse width limit value and therefore may be set to the pulse width limit value, or both of the first and second pulse widths may go out of the ranges of pulse width limit values and therefore may be set to the pulse width limit values, and the maximum driving speeds may be increased.

In the fourth exemplary embodiment described below, instead of determining whether the control amount of either of the first and second pulse widths goes out of the range of a pulse width limit value, or the control amounts of both of the first and second pulse widths go out of the ranges of pulse width limit values, it may be determined whether the driving speeds are smaller than target speeds. Specifically, this method is as follows.

The control unit limits the range in which the first pulse width is set to a first pulse width limit value as a predetermined limit value, and limits the range in which the second pulse width is set to a second pulse width limit value as a predetermined limit value. To limit the ranges in which the pulse widths are set, the limit values may be set in advance, or may be appropriately set by an input from outside.

If the first pulse width is the first pulse width limit value, it is determined whether a first driving speed, which is the speed of the first contact body relative to the first vibrating body, is smaller than a first target speed, which is a target driving speed. If the second pulse width is the second pulse width limit value, it is determined whether a second driving speed, which is the speed of the second contact body relative to the second vibrating body, is smaller than a second target speed, which is a target driving speed.

If it is determined that at least either the first driving speed is smaller than the first target speed or the second driving speed is smaller than the second target speed, the driving frequencies are lowered when the driving frequencies are commonly set.

The first and second pulse width limit values are set to 50%, for example. The present disclosure, however, is not limited to this. Alternatively, the first and second pulse width limit values may be set to another value, such as 30% and 70%.

Figure 8:
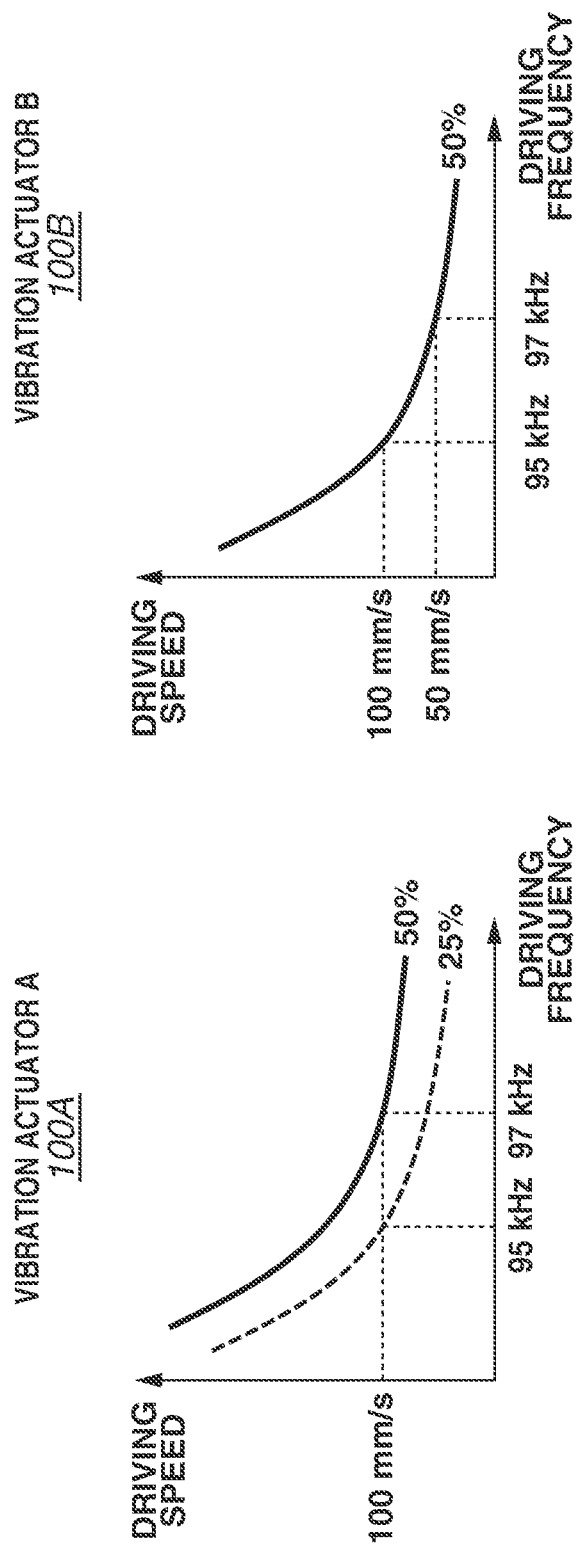
FIG. 8 is a diagram illustrating a control method according to a third exemplary embodiment.

A third exemplary embodiment will be described below. In the third exemplary embodiment, a description will be provided of a method for, in a case where the relationships between the driving frequencies and the driving speeds (such relationships are referred to as the driving characteristics) of a plurality of vibration actuators are greatly different from each other in the first exemplary embodiment, bringing the driving characteristics closer to each other, commonly setting the driving frequencies, and performing driving control. FIG. 8 illustrates the relationship between the driving frequency and the driving speed of each of the vibration actuator A 100A and the vibration actuator B 100B (such a relationship is referred to as the driving characteristics). In FIG. 8, a solid line indicates the driving characteristic in a case where the pulse width is 50%. A dotted line indicates the driving characteristic in a case where the pulse width is 25%.

As illustrated in FIG. 8, for example, in a case where the pulse widths of the vibration actuator A 100A and the vibration actuator B 100B are commonly set to 50%, the relationships between the driving frequencies and the driving speeds of the vibration actuator A 100A and the vibration actuator B 100B (such relationships are referred to as the driving characteristics) may be different from each other. Thus, in a case where the commonly set driving frequencies are 97 kHz, the driving speed of the vibration actuator A 100A is 100 mm/s, whereas the driving speed of the vibration actuator B 100B is 50 mm/s. Thus, a difference occurs between the driving speeds.

Thus, the pulse width of the vibration actuator A 100A is set to 25% as indicated by a dotted line, thus bringing the driving characteristic of the vibration actuator A 100A closer to the driving characteristic of the vibration actuator B 100B. Further, the common driving frequencies are changed to 95 kHz. This can bring the driving speed of the vibration actuator B 100B closer to 100 mm/s, which is the driving speed of the vibration actuator A 100A. As a result, it is possible to bring the relationships between the driving frequencies and the driving speeds of a plurality of vibration actuators (such relationships are referred to as the driving characteristics) closer to each other, commonly set the driving frequencies of the plurality of vibration actuators, and perform driving control.

Figure 9:
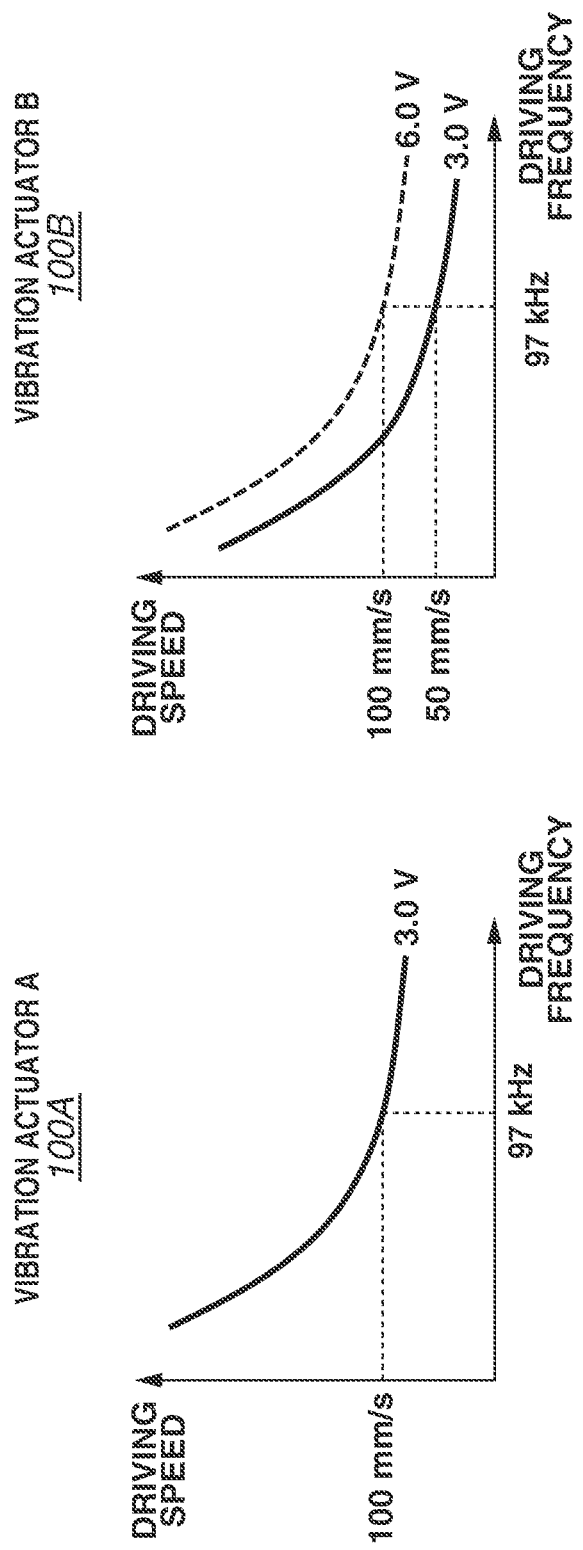
FIG. 9 is a diagram illustrating another control method according to the third exemplary embodiment.

As another method, a method of making adjustment based on power supply voltages will be described. FIG. 9 illustrates the relationship between the driving frequency and the driving speed of each of the vibration actuator A 100A and the vibration actuator B 100B (such a relationship is referred to as the driving characteristics) in a case where the phase differences of the vibration actuator A 100A and the vibration actuator B 100B are phase difference limit values. In FIG. 9, a solid line indicates the driving characteristic in a case where a power supply voltage is 3 V. A dotted line indicates the driving characteristic in a case where the power supply voltage is 6 V. This power supply voltage is a voltage output from the power supply 161A illustrated in FIG. 4A. In this method, the power supply is individually provided in each of the vibration actuator A 100A and the vibration actuator B 100B.

As illustrated in FIG. 9, for example, in a case where the power supply voltages of the vibration actuator A 100A and the vibration actuator B 100B are commonly set to 3 V, the relationships between the driving frequencies and the driving speeds of the vibration actuator A 100A and the vibration actuator B 100B (such relationships are referred to as the driving characteristics) are different from each other in some cases. Thus, in a case where the commonly set driving frequencies are 97 kHz, the driving speed of the vibration actuator A 100A is 100 mm/s, whereas the driving speed of the vibration actuator B 100B is 50 mm/s. Thus, a difference occurs between the driving speeds.

In response, the power supply voltage of the vibration actuator B 100B is set to 6 V as indicated by a dotted line, thus brining the driving characteristic of the vibration actuator B 100B closer to the driving characteristic of the vibration actuator A 100A. This enables the driving speed of the vibration actuator B 100B to be brought closer to 100 mm/s, which is the driving speed of the vibration actuator A 100A.

As a result, it is possible to bring the relationships between the driving frequencies and the driving speeds of a plurality of vibration actuators (such relationships are referred to as the driving characteristics) closer to each other, commonly set the driving frequencies of the plurality of vibration actuators, and perform driving control.

While a method of changing only either of the pulse widths and the power supply voltages has been described, the present disclosure is not limited to this. Alternatively, both the pulse widths and the power supply voltages may be changed to bring the driving characteristics, or the relationships between the driving frequencies and the driving speeds of a plurality of vibration actuators closer to each other, the driving frequencies of the plurality of vibration actuators may be commonly set, and driving control may be performed.

A fourth exemplary embodiment will be described. In the fourth exemplary embodiment, a description will be provided of a configuration in which, instead of the control of the phase difference in accordance with the control amount in the first exemplary embodiment, control is performed based on a pulse width in accordance with a control amount.

Figure 10:
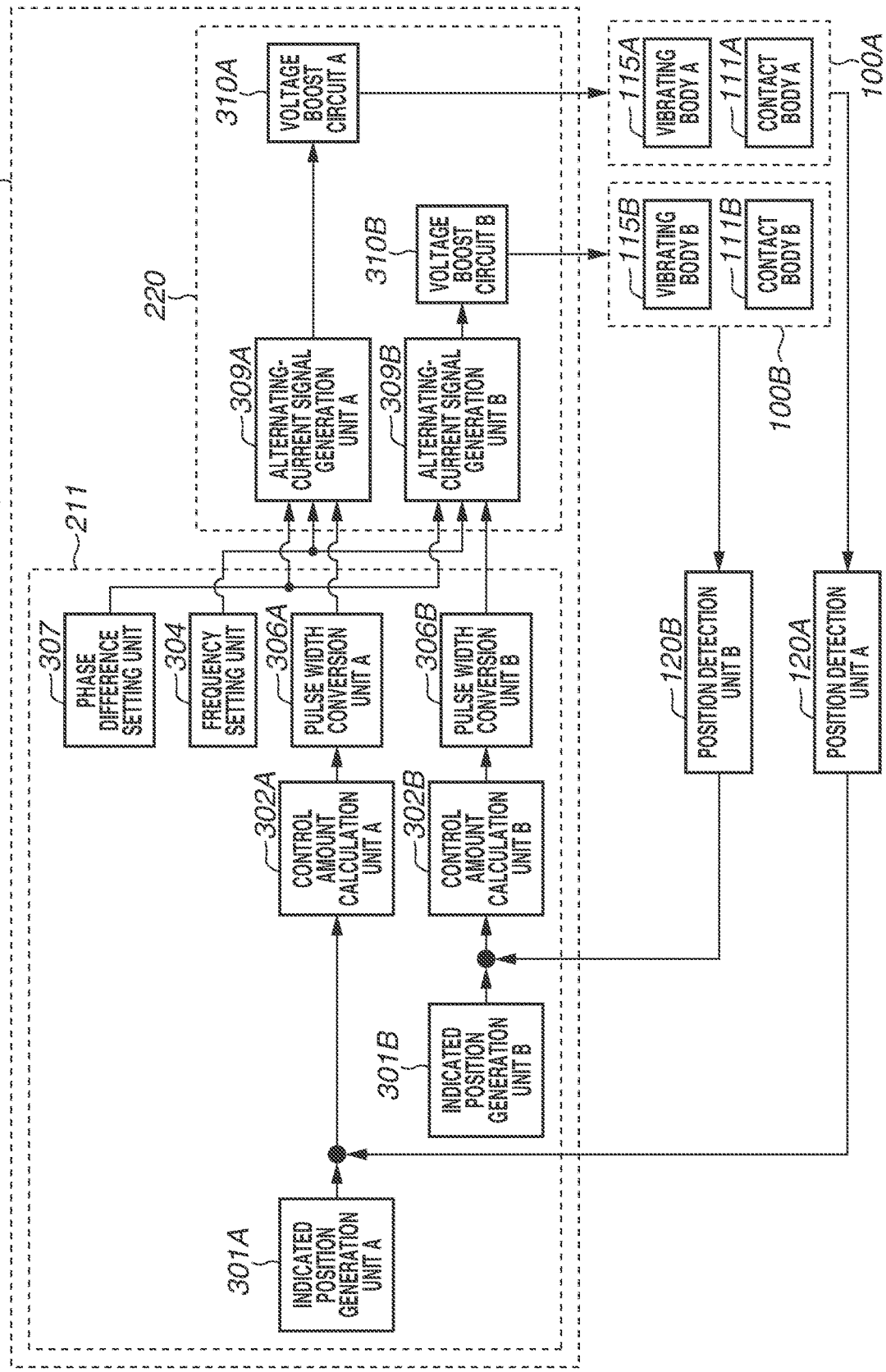
FIG. 10 is a block diagram illustrating a general configuration of a vibration driving apparatus according to a fourth exemplary embodiment.

FIG. 10 is a block diagram illustrating the general configuration of a vibration driving apparatus 151 including a control device 201 that simultaneously performs driving control of the vibration actuator A 100A and the vibration actuator B 100B. The vibration actuator A 100A, the vibration actuator B 100B, the position detection unit A 120A, the position detection unit B 120B, and the driving unit 220 illustrated in FIG. 10 have been described in conjunction with FIGS. 1 and 15A to 15D, and descriptions thereof are omitted here. The same principles and the same variations as those of the first exemplary embodiment are not described here, either.

A control unit 211 includes an indicated position generation unit A 301A (a first position indication unit) and an indicated position generation unit B 301B (a second position indication unit). The control unit 211 includes a control amount calculation unit A 302A, a control amount calculation unit B 302B, a pulse width conversion unit A 306A, a pulse width conversion unit B 306B, a frequency setting unit 304, and a phase difference setting unit 307. The indicated position generation unit A 301A and the indicated position generation unit B 301B generate indicated positions for moving the contact body A 111A and the contact body B 111B, respectively. Signals regarding the deviations between the indicated positions, which are outputs from the indicated position generation unit A 301A and the indicated position generation unit B 301B, and outputs from the position detection unit A 120A and the position detection unit B 120B are input to the control amount calculation unit A 302A and the control amount calculation unit B 302B, respectively. The control amount calculation unit A 302A and the control amount calculation unit B 302B calculate control amounts of the vibrating body A 115A and the vibrating body B 115B, respectively.

The control amounts output from the control amount calculation unit A 302A and the control amount calculation unit B 302B are input to the pulse width conversion unit A 306A and the pulse width conversion unit B 306B, respectively. The pulse width conversion unit A 306A converts the control amount acquired from the control amount calculation unit A 302A into a first pulse width, thus setting the voltage value of a first alternating-current voltage and determining the size of the ellipse of the elliptical motion to be excited at the projection portions 112 of the vibrating body A 115A.

The pulse width conversion unit B 306B converts the control amount acquired from the control amount calculation unit B 302B into a second pulse width, thus setting the voltage value of a second alternating-current voltage and determining the size of the ellipse of the elliptical motion to be excited at the projection portions 112 of the vibrating body B 115B. In other words, the voltage value of the first alternating-current voltage and the voltage value of the second alternating-current voltage are individually set based on a first control signal and a second control signal, respectively. At this time, each of the voltage value of the first alternating-current voltage and the voltage value of the second alternating-current voltage to be set may be any of the maximum value, the root mean square value, and the average value of the alternating-current voltage.

The frequency setting unit 304 commonly sets the driving frequencies of the vibrating body A 115A and the vibrating body B 115B (commonly sets the frequency of the first alternating-current voltage and the frequency of the second alternating-current voltage), thus determining the sizes of the ellipses of the elliptical motions to be excited at the projection portions 112. The phase difference setting unit 307 sets common phase differences for the vibrating body A 115A and the vibrating body B 115B (commonly sets the phase difference of the first alternating-current voltage and the phase difference of the second alternating-current voltage), thus determining the elliptical ratios of the elliptical motions to be excited at the projection portions 112.

An output from the pulse width conversion unit A 306A, an output from the frequency setting unit 304, and an output from the phase difference setting unit 307 forms a first control signal and are input as the first control signal to the alternating-current signal generation unit A 309A. An output from the pulse width conversion unit B 306B, an output from the frequency setting unit 304, and an output from the phase difference setting unit 307 forms a second control signal and are input as the second control signal to the alternating-current signal generation unit B 309B.

Figure 11:
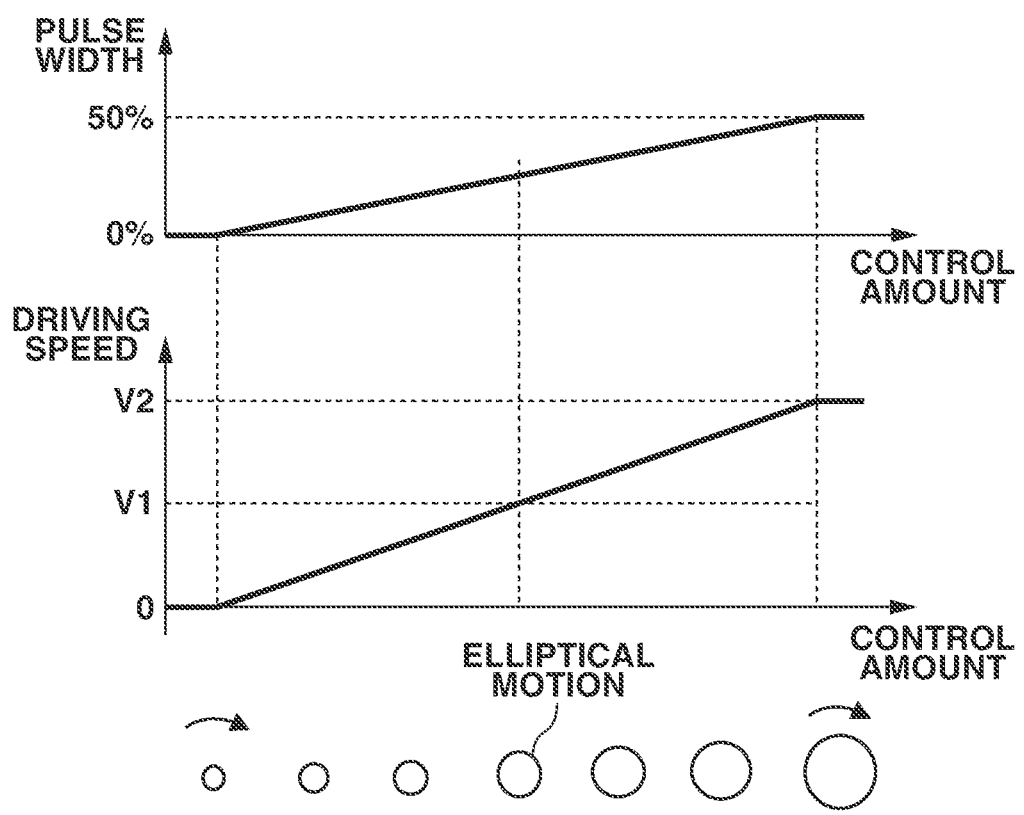
FIG. 11 is a diagram illustrating a relationship between a control amount output from a control amount calculation unit and a pulse width which is controlled based on the control amount, and a relationship between the control amount output from the control amount calculation unit and a driving speed of a vibration actuator, according to the fourth exemplary embodiment.

FIG. 11 illustrates the relationship between a control amount output from a control amount calculation unit and a pulse width controlled based on the control amount (such a relationship is also referred to as the driving characteristic). FIG. 11 also illustrates the relationship between the control amount output from the control amount calculation unit and the driving speed of the vibration actuator (such a relationship is also referred to as the driving characteristic). Specifically, FIG. 11 illustrates the relationship between a control amount output from the control amount calculation unit A 302A (a first control amount calculation unit) or the control amount calculation unit B 302B (a second control amount calculation unit) and a control signal (a pulse width) output from the control unit 211. FIG. 11 also illustrates the relationship (the driving characteristic) between the control amount output from of the control amount calculation unit A 302A (the first control amount calculation unit) or the control amount calculation unit B 302B (the second control amount calculation unit) and the driving speed of the contact body A 111A or the contact body B 111B. To drive the vibration actuator A 100A or the vibration actuator B 100B, the control amount output from the control amount calculation unit A 302A or the control amount calculation unit B 302B is controlled by the pulse width being changed.

Figure 12:
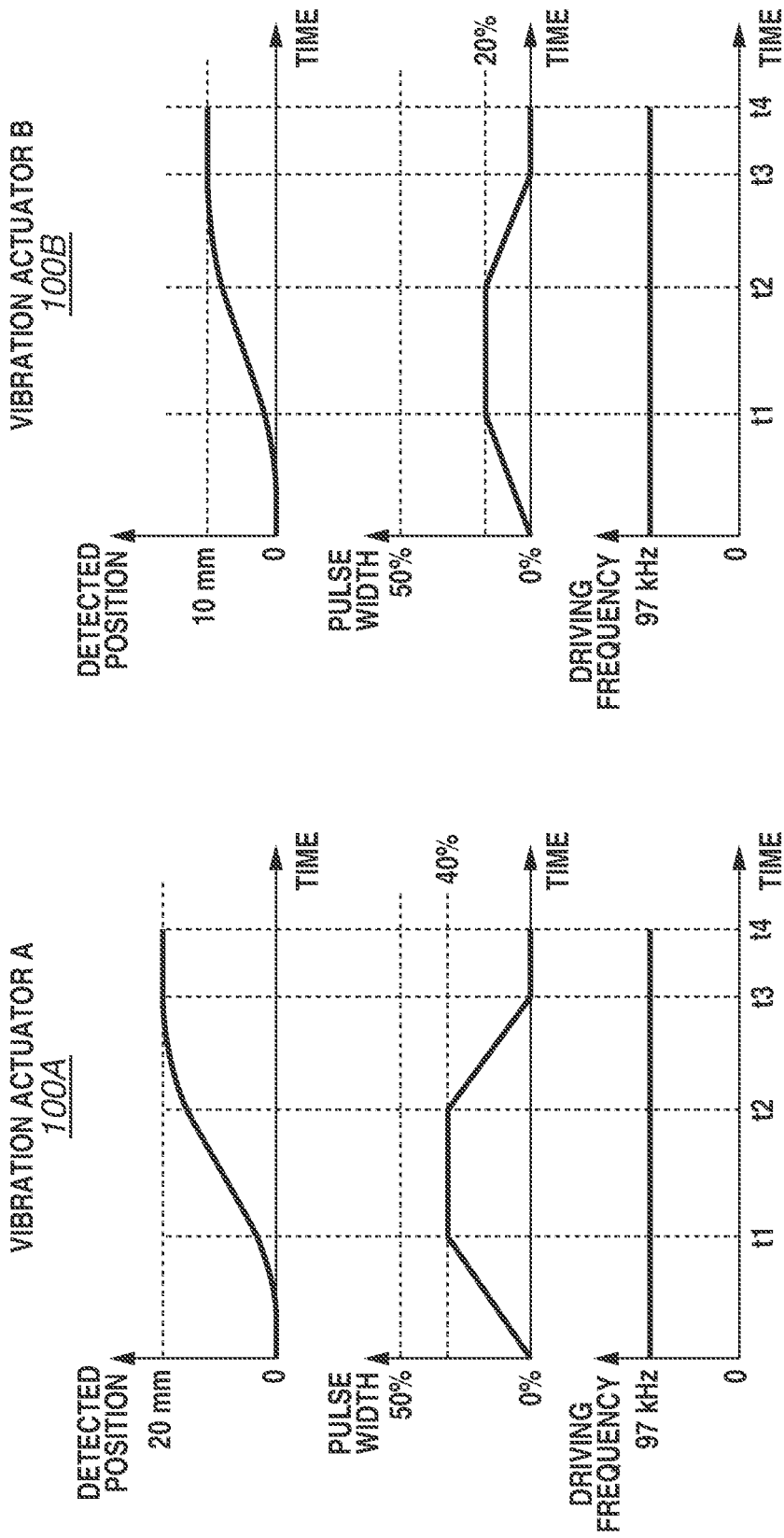
FIG. 12 is a diagram illustrating relationships between parameters in a case where position control is performed, according to the fourth exemplary embodiment.

FIG. 12 illustrates examples of the relationships between time and the current position (the detected position), the phase difference, and the driving frequency of each of the vibration actuator A 100A and the vibration actuator B 100B (such relationships are referred to as the driving characteristics). FIG. 12 illustrates an example of a case where the target stop positions of the vibration actuators are different from each other, driving control is performed so that the vibration actuator A 100A is moved to a target stop position of 20 mm and the vibration actuator B 100B is moved to a target stop position of 10 mm. As illustrated in FIG. 12, the driving frequencies (97 kHz) of the vibration actuator A 100A and the vibration actuator B 100B are commonly set. The pulse widths of the vibration actuator A 100A and the vibration actuator B 100B are individually set within the range of 0 to 50%. The vibration actuator A 100A and the vibration actuator B 100B are controlled based on these pulse widths.

If the driving of the vibration actuator A 100A is started, the pulse width of the vibration actuator A 100A is gradually increased in accordance with the deviation between the indicated position and the current position (the detected position) and gradually increased until a time t1. The pulse width of the vibration actuator A 100A is controlled at near 40% until a time t2 and gradually decreased until a time t3, and the driving control ends at a time t4. In contrast, the target stop position of the vibration actuator B 100B is closer than that of the vibration actuator A 100A, and the amount of change in the indicated position per time of the vibration actuator B 100B is smaller than that of the vibration actuator A 100A, and thus, the pulse width of the vibration actuator B 100B is controlled at near 20% from the time t1 to the time t2.

In this way, a plurality of vibration actuators is controlled based on commonly set driving frequencies and pulse widths individually set in accordance with the deviation between an indicated position and a current position (a detected position). Consequently, it is possible to perform driving control suitable for driving conditions and motor characteristics (driving characteristics) even in a case where the target stop positions of the plurality of vibration actuators are different from each other.

With a configuration as described above, it is possible to perform driving control without producing a beat note even in a case where the target stop positions and/or the driving speeds of a plurality of vibration actuators are different from each other.

A fifth exemplary embodiment will be described below. In the fifth exemplary embodiment, a description will be provided of a method of, in a case where the relationships between the driving frequencies and the driving speeds of a plurality of vibration actuators (such relationships are referred to as the driving characteristics) are greatly different from each other in the fourth exemplary embodiment, bringing the driving characteristics closer to each other, commonly setting the driving frequencies, and performing driving control.

Figure 13:
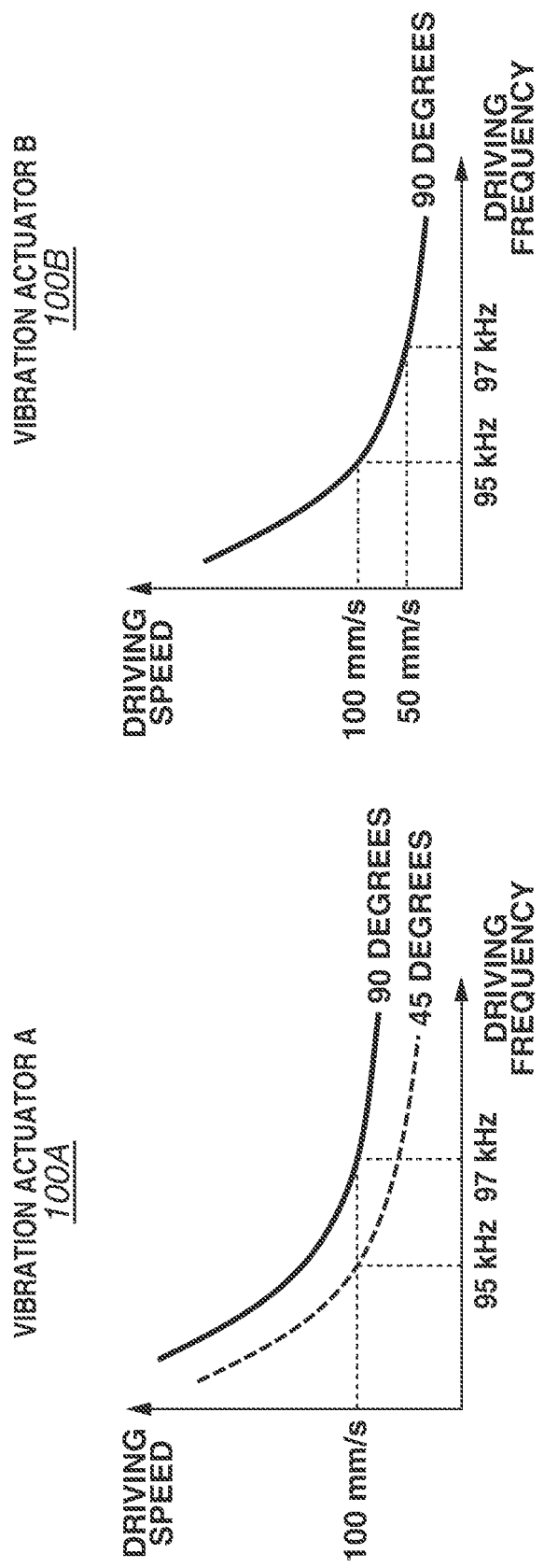
FIG. 13 is a diagram illustrating a control method according to a fifth exemplary embodiment.

FIG. 13 illustrates the relationship between the driving frequency and the driving speed of each of the vibration actuator A 100A and the vibration actuator B 100B (such relationships are referred to as the driving characteristics). In FIG. 13, a solid line indicates the driving characteristic in a case where the phase difference is 90 degrees. A dotted line indicates the driving characteristic in a case where the phase difference is 45 degrees.

As illustrated in FIG. 13, for example, in a case where the phase differences of the vibration actuator A 100A and the vibration actuator B 100B are commonly set to 90 degrees, the relationships between the driving frequencies and the driving speeds of the vibration actuator A 100A and the vibration actuator B 100B (such relationships are referred to as the driving characteristics) may be different from each other. Thus, in a case where the common driving frequencies are 97 kHz, the driving speed of the vibration actuator A 100A is 100 mm/s, whereas the driving speed of the vibration actuator B 100B is 50 mm/s. Thus, a difference occurs between the driving speeds.

In response, the phase difference of the vibration actuator A 100A is set to 45 degrees as indicated by a dotted line, thus bringing the driving characteristic of the vibration actuator A 100A closer to the driving characteristic of the vibration actuator B 100B. Further, the common driving frequencies are changed to 95 kHz. This enables the driving speed of the vibration actuator B 100B to be brought closer to 100 mm/s, which is the driving speed of the vibration actuator A 100A. As a result, it is possible to bring the relationships between the driving frequencies and the driving speeds of a plurality of vibration actuators (such relationships are referred to as the driving characteristics) closer to each other, commonly set the driving frequencies of the plurality of vibration actuators, and perform driving control.

Figure 14:
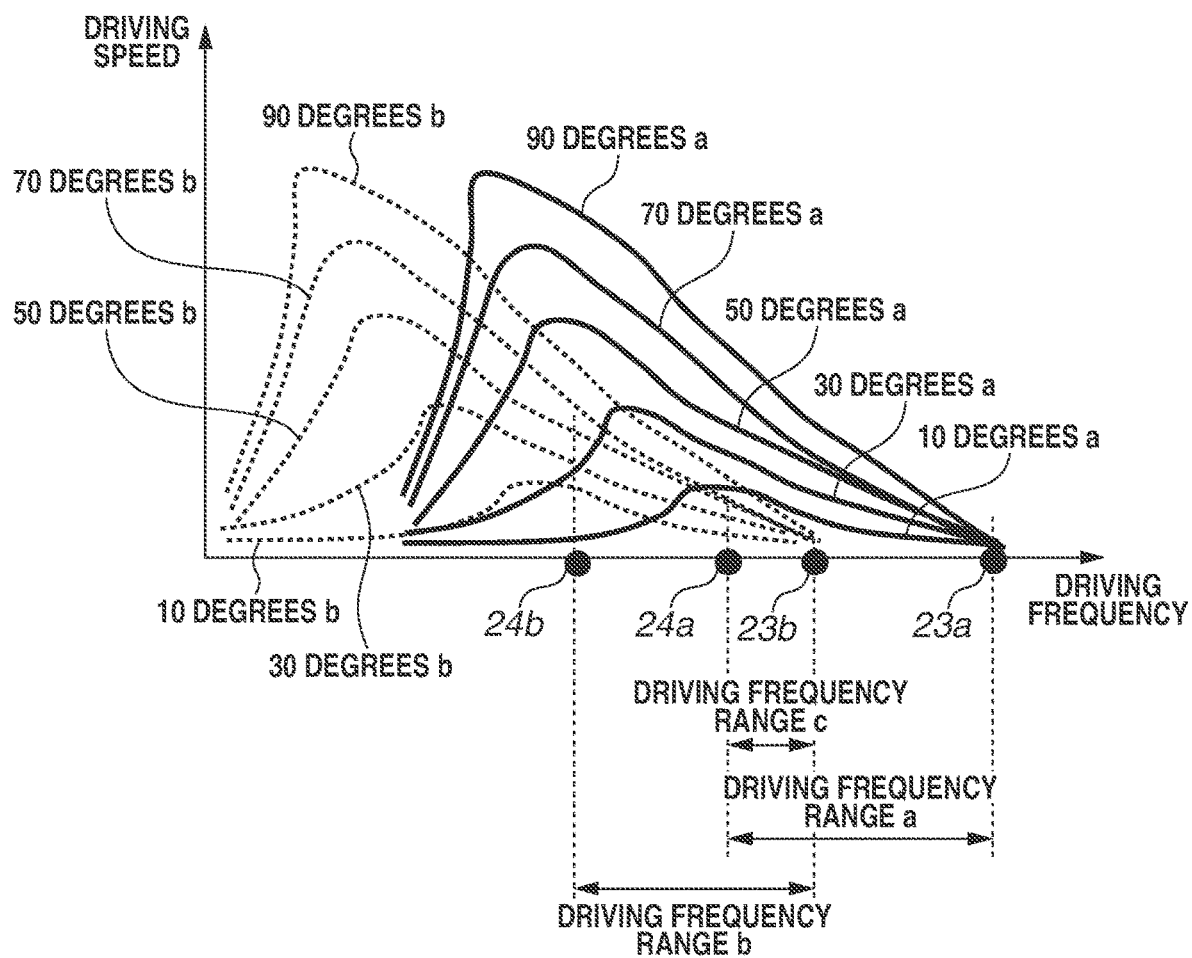
FIG. 14 is a diagram illustrating a relationship between a driving frequency and a driving speed with respect to each of phase differences of a plurality of vibration actuators according to a sixth exemplary embodiment.

A sixth exemplary embodiment will be described below. In the sixth exemplary embodiment, a description will be provided of the setting of a driving frequency fe in a case where a plurality of vibration actuators in which a difference occurs between the resonance frequencies is driven at common driving frequencies, with respect to the configurations of the first to fifth exemplary embodiments. FIG. 14 is a graph illustrating the relationships between the driving frequencies and the driving speeds of a plurality of vibration actuators in which a difference occurs between the resonance frequencies in a case where the phase difference between the voltages V1 and V2 in two phases (a plurality of phases) to be applied to the piezoelectric element illustrated in FIG. 15B is changed when the plurality of vibration actuators is driven.

The relationship between the driving frequency and the driving speed of the vibration actuator A 100A (such a relationship is referred to as the driving characteristic) in a case where the phase difference of the vibration actuator A 100A is changed from 90 to 10 degrees is 90 degrees a to 10 degrees a indicated by solid lines in FIG. 14. The resonance frequency of the vibration actuator A 100A in a case where the phase difference of the vibration actuator A 100A is 0 degrees is a resonance frequency 24a illustrated in FIG. 14. Similarly, the driving characteristic or the relationship between the driving frequency and the driving speed of the vibration actuator B 100B in a case where the phase difference of the vibration actuator B 100B is changed from 90 to 10 degrees is 90 degrees b to 10 degrees b indicated by dotted lines in FIG. 14. The resonance frequency of the vibration actuator B 100B in a case where the phase difference of the vibration actuator B 100B is 0 degrees is a resonance frequency 24b illustrated in FIG. 14. The maximum driving frequency at which the vibration actuator A 100A cannot be driven is a maximum driving frequency 23a. The maximum driving frequency at which the vibration actuator B 100B cannot be driven is a maximum driving frequency 23b.

In the present exemplary embodiment, the ranges of the driving frequencies (the driving frequency ranges) set by the frequency setting unit 304 based on the driving characteristics of the vibration actuator A 100A and the vibration actuator B 100B are determined as follows. A lower limit (a first lower limit) of a driving frequency range a of the vibration actuator A 100A is the resonance frequency of the vibration actuator A 100A in a case where the phase difference is 0 degrees (i.e., the lower limit is the maximum resonance frequency when the phase difference is changed) as described above. An upper limit (a first upper limit) of the driving frequency range a is the maximum driving frequency at which the contact body can be driven in driving the contact body at a driving frequency higher than the first lower limit. The driving frequency range a falls within a range between the first lower limit and the first upper limit inclusive determined in this way.

A lower limit (a second lower limit) of a driving frequency range b of the vibration actuator B 100B is the resonance frequency of the vibration actuator B 100B in a case where the phase difference is 0 degrees. An upper limit (a second upper limit) of the driving frequency range b is the maximum driving frequency at which the contact body can be driven in driving the contact body at a driving frequency higher than the second lower limit. The driving frequency range b falls within a range between the second lower limit and the second upper limit inclusive determined as described above.

A case will be described where the vibration actuator A 100A and the vibration actuator B 100B are driven.

For example, in a case where a plurality of vibration actuators is driven, and even if the phase difference of the vibration actuator B 100B is changed at the resonance frequency of the vibration actuator A 100A in a case where the phase difference of the vibration actuator A 100A is 30 degrees a, a cliff drop phenomenon that the driving speed rapidly decreases does not occur.

However, at the resonance frequency of the vibration actuator B 100B in a case where the phase difference of the vibration actuator B 100B is 30 degrees b, a cliff drop phenomenon occurs no matter which phase difference the vibration actuator A 100A has. Thus, the driving speed of the vibration actuator A 100A rapidly decreases, resulting in the driving speed being braked, which causes the driving speed to enter an unstable state.

In other words, in a case where the driving is performed at a driving frequency lower than the driving frequency range a of the vibration actuator A 100A, which has a high resonance frequency, there is a possibility that a cliff drop phenomenon occurs. Conversely, in a case where the driving is performed at a driving frequency higher than the driving frequency range b of the vibration actuator B 100B, which has a low resonance frequency, there is a possibility that the driving speed decreases and the vibration actuator A 100A ceases to operate.

In response to this, in the present exemplary embodiment, the range in which the driving frequency ranges a and b set based on the driving characteristics of the plurality of vibration actuators overlap is set as a driving frequency range c. The driving frequencies can be commonly set (changed) in the driving frequency range c. Thus, it is possible to drive the vibration actuator A 100A and the vibration actuator B 100B while avoiding the state where the driving speeds of the vibration actuator A 100A and the vibration actuator B 100B are unstable even in a case where the driving frequencies of the vibration actuator A 100A and the vibration actuator B 100B are commonly set.

A seventh exemplary embodiment will be described below. In the seventh exemplary embodiment, an example will be described in which the present disclosure is applied to an imaging apparatus (an electronic device) having a pan/tilt mechanism, which is an example of an apparatus including the vibration driving apparatus 150 or 151 according to any of the above exemplary embodiments. For example, the vibration actuator A 100A is used for tilt driving, and the vibration actuator B 100B is used for pan driving. FIG. 18A is a perspective view illustrating the configuration of a tilt driving unit of a pan/tilt camera using the vibration actuators according to the first exemplary embodiment. FIG. 18B is a perspective view illustrating the configuration of a pan driving unit of the pan/tilt imaging apparatus.

In FIGS. 18A and 18B, a pan/tilt camera 1000 (an electronic device) includes a base 1001 (a driving target member) and a camera unit 1002 (a lens integrated imaging apparatus, a driving target member). The pan/tilt camera 1000 includes a tilt driving vibration actuator 1003, a tilt motor pinion gear 1004, a tilt gear 1005, a tilt portion encoder sensor 1006, and a tilt portion encoder scale 1007.

Further, the pan/tilt camera 1000 includes a pan driving vibration actuator 1010, a pan motor pinion gear 1011, a pan gear 1012, a pan portion encoder sensor 1013, and a pan portion encoder scale 1014. The pan/tilt camera 1000 performs an image capturing operation by the camera unit 1002 (a driving target member) disposed on the base 1001 (a driving target member) being rotationally moved in a tilt direction (the direction of an arrow B1 and the direction of an arrow B2 in FIG. 18A) and a pan direction (the direction of an arrow D1 and the direction of an arrow D2 in FIG. 18B). A pan unit 1015 includes the camera unit 1002 and a tilt driving unit.

The camera unit 1002 includes a tilt motor shaft and a pan motor shaft (not illustrated). The tilt driving vibration actuator 1003 generates a driving force to rotationally move the camera unit 1002 in the tilt direction.

The pan driving vibration wave motor 1010 generates a driving force to rotationally move the camera unit 1002 in the pan direction. The tilt motor pinion gear 1004 is fixed to the motor shaft of the vibration actuator 1010. The tilt gear 1005 is attached to the tilt motor shaft and engaged with the tilt motor pinion gear 1004.

The pan portion encoder scale 1014 includes a slit portion (not illustrated) and is attached to the pan motor shaft. The pan portion encoder scale 1014 rotates in the directions of the arrows D1 and D2 together with the pan gear 1012, i.e., the rotation of the camera unit 1002. The pan portion encoder sensor 1013 reads the slit portion of the pan portion encoder scale 1014, thus detecting the rotational position of the pan portion encoder scale 1014.

If the pan driving vibration actuator 1010 rotates in the direction of an arrow C1 (a rotational direction within a plane perpendicular to the base surface), the camera unit 1002 rotates in the direction of the arrow D1 (a rotational direction within a plane parallel to the base surface) by gear coupling between the pan motor pinion gear 1011 and the pan gear 1012. If, on the other hand, the pan driving vibration actuator 1010 rotates in the direction of an arrow C2 (a rotational direction within the plane perpendicular to the base surface), the camera unit 1002 rotates in the direction of the arrow D2 (a rotational direction within the plane parallel to the base surface) by gear coupling between the pan motor pinion gear 1011 and the pan gear 1012.

The tilt portion encoder scale 1007 includes a slit portion (not illustrated) and is attached to the tilt motor shaft. The tilt portion encoder scale 1007 rotates in the directions of the arrows B1 and B2 together with the tilt gear 1005, i.e., the rotation of the camera unit 1002. The tilt portion encoder sensor 1006 reads the slit portion of the tilt portion encoder scale 1007, thus detecting the rotational position of the encoder scale 1007.

If the tilt driving vibration actuator 1003 rotates in the direction of an arrow A1 (a rotational direction within a plane parallel to the base surface), the camera unit 1002 rotates in the direction of the arrow B1 (a rotational direction within a plane perpendicular to the base surface) by gear coupling between the tilt motor pinion gear 1004 and the tilt gear 1005. If, on the other hand, the tilt driving vibration actuator 1003 rotates in the direction of an arrow A2 (a rotational direction within the plane parallel to the base surface), the camera unit 1002 rotates in the direction of the arrow B2 (a rotational direction within the plane perpendicular to the base surface) by gear coupling between the tilt motor pinion gear 1004 and the tilt gear 1005.

Figure 19:
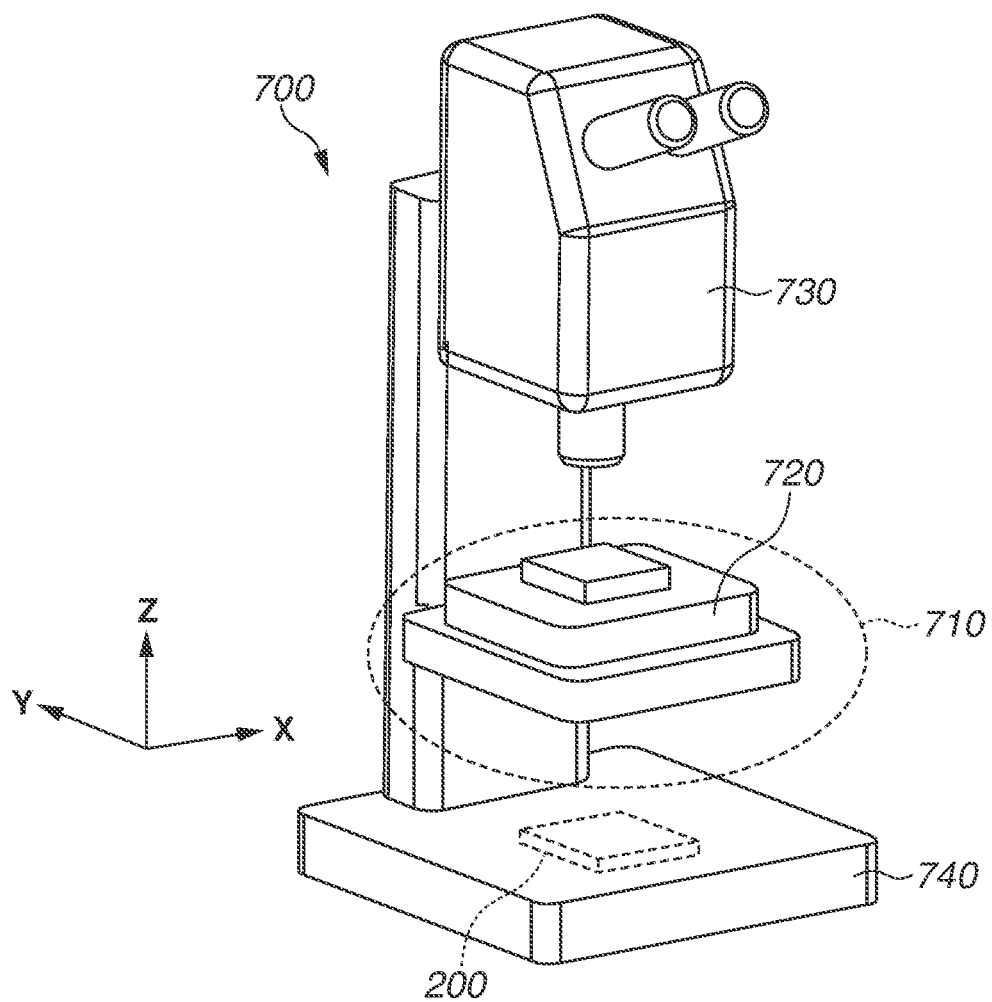
FIG. 19 is a perspective view illustrating a general structure of a positioning stage apparatus including the vibration driving apparatus, according to an eighth exemplary embodiment.

An eighth exemplary embodiment will be described below. In the eighth exemplary embodiment, an example will be described in which the present disclosure is applied to the positioning of a stage on which an observation target object is placed in a positioning stage apparatus, which is an example of an apparatus including the vibration driving apparatus 150 or 151 in accordance with the above exemplary embodiments. FIG. 19 is an external perspective view of a microscope 700 including the vibration driving apparatus 150. The microscope 700 includes an image capturing unit 730 having an image sensor and an optical system built-in, and an automatic stage unit 710 including a stage 720 movable within an XY plane on a base.

The control device 200 included in the vibration driving apparatus 150 or the control device 201 included in the vibration driving apparatus 151 is placed in a base plate 740. The present disclosure, however, is not limited to this. For example, the control device 200 or 201 may be provided in the image capturing unit 730. At least two vibrating bodies 115 included in the vibration actuator 100 (not illustrated) are used. For example, the vibrating body A 115A of the vibration actuator A 100A is used to drive the stage 720 corresponding to the contact body A 111A in an X-direction and is placed so that the X-direction of the vibrating body A 115A coincides with the X-direction of the stage 720.

The vibrating body B 115B of the vibration actuator B 100B is used to drive the stage 720 corresponding to the contact body B 111B in a Y-direction and is placed so that the Y-direction of the vibrating body B 115B coincides with the Y-direction of the stage 720. In a case where an observation target object is placed on an upper surface of the stage 720 and an enlarged image of the observation target object is captured by the image capturing unit 730, and if the observation range is a wide range, the stage 720 is moved in the X-direction and the Y-direction by driving the automatic stage unit 710, thus moving the observation target object. Thus, many images are captured, and the captured images are combined together by image processing by a computer (not illustrated), so that it is possible to acquire a single high-definition image having a wide observation range.

Other Exemplary Embodiments

In the seventh and eighth exemplary embodiments, apparatuses to which the vibration driving apparatus 150 is applied have been described. Specific examples of the application of the vibration driving apparatus 150, however, are not limited to these. The vibration driving apparatus 150 can be widely applied to an electronic device including components that need to be positioned by the driving of the vibration actuator A 100A and the vibration actuator B 100B.

While the present disclosure has been described in detail above based on its suitable exemplary embodiments, the present disclosure is not limited to these specific exemplary embodiments. The present disclosure also includes various forms without departing from the spirit and scope of the disclosure. For example, the above exemplary embodiments have been described based on a configuration in which the vibrating body A 115A and the vibrating body B 115B are fixed, and the contact body A 111A and the contact body B 111B are moved (driven) as moving bodies. However, the effect does not change at all even with a configuration in which, conversely, the contact body A 111A and the contact body B 111B are fixed, and the vibrating body A 115A and the vibrating body B 115B are moved (driven) as moving bodies.

The indicated position generation unit A 301A and the indicated position generation unit B 301B obtain indicated positions regarding the positions of the contact body A 111A and the contact body B 111B based on position signals from the position detection unit A 120A and the position detection unit B 120B, respectively. The present disclosure, however, is not limited to this. For example, indicated speeds regarding the driving speeds of the contact body A 111A and the contact body B 111B may be obtained based on detected driving speeds.

The components of the control unit 210 and the driving unit 220 (i.e., electronic devices and electric components used therein) are not limited so long as the above functions can be achieved. As the control device 200 or 201, the configuration of two-phase driving for separately driving the piezoelectric element 114 in two phases is employed. The present disclosure, however, is not limited to a two-phase driving vibration actuator. The present disclosure can also be applied to a vibration actuator driven by a plurality of alternating-current voltages in three or more phases.

Further, in the present disclosure, a configuration is employed in which two vibration actuators are used. The present disclosure, however, is not limited to two vibration actuators. Alternatively, a configuration may be employed in which three or more vibration actuators are used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide a vibration actuator control device that prevents reductions in the ranges of driving speeds that can be adopted by a plurality of vibration actuators as compared with a conventional vibration actuator control device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A vibration actuator control device comprising:
a first vibration actuator including a first vibrating body and a first contact body in contact with the first vibrating body;
a second vibration actuator including a second vibrating body and a second contact body in contact with the second vibrating body;
a control unit configured to output a first control signal for controlling driving of the first vibration actuator, and output a second control signal for controlling driving of the second vibration actuator; and
a driving unit configured to (i) output a plurality of first alternating-current voltages based on the first control signal, for driving the first vibration actuator, and (ii) output a plurality of second alternating-current voltages based on the second control signal, for driving the second vibration actuator,
wherein the control unit has a common frequency setting unit,
wherein the control unit individually sets a phase difference of a first alternating-current voltage and a phase difference of a second alternating-current voltage or a voltage value of the first alternating-current voltage and a voltage value of the second alternating-current voltage based on the first control signal and the second control signal, respectively,
wherein the common frequency setting unit commonly sets a frequency of the first alternating-current voltage and a frequency of the second alternating-current voltage,
wherein the control unit individually sets the phase difference of the first alternating-current voltage and the phase difference of the second alternating-current voltage based on the first control signal and the second control signal, respectively, and commonly sets the frequency of the first alternating-current voltage and the frequency of the second alternating-current voltage,
wherein, in a case where the phase difference of the first alternating-current voltage is a first phase difference limit value which is a first predetermined limit value, the control unit determines whether a first driving speed which is a speed of the first contact body relative to the first vibrating body, is smaller than a first target speed which is a target driving speed and, in a case where the phase difference of the second alternating-current voltage is a second phase difference limit value which is a second predetermined limit value, the control unit determines whether a second driving speed which is a speed of the second contact body relative to the second vibrating body, is smaller than a second target speed which is a target driving speed, and
wherein, in a case where the control unit determines that at least either the first driving speed is smaller than the first target speed or the second driving speed is smaller than the second target speed, the control unit lowers the frequency of the first alternating-current voltage and the frequency of the second alternating-current voltage in commonly setting the frequency of the first alternating-current voltage and the frequency of the second alternating-current voltage.

2. The vibration actuator control device according to claim 1, wherein the control unit individually sets the phase difference of the first alternating-current voltage and the phase difference of the second alternating-current voltage based on the first control signal and the second control signal, respectively, so as to bring a first driving speed which is a speed of the first contact body relative to the first vibrating body and a second driving speed which is a speed of the second contact body relative to the second vibrating body closer to each other.

3. The vibration actuator control device according to claim 1, wherein the control unit commonly sets the voltage value of the first alternating-current voltage and the voltage value of the second alternating-current voltage based on the first control signal and the second control signal, respectively.

4. The vibration actuator control device according to claim 1,
wherein the first alternating-current voltage is generated from a first direct-current voltage supplied from a first power supply, and
wherein the second alternating-current voltage is generated from a second direct-current voltage supplied from a second power supply.

5. The vibration actuator control device according to claim 4, wherein the first power supply and the second power supply are different power supplies.

6. The vibration actuator control device according to claim 1, wherein each of the voltage value of the first alternating-current voltage and the voltage value of the second alternating-current voltage is any of a maximum value, a root mean square value, and an average value of an alternating-current voltage.

7. An optical apparatus comprising:
the vibration actuator control device according to claim 1; and
an optical member.

8. An electronic device comprising:
the vibration actuator control device according to claim 1; and
a member.

9. A vibration actuator control device comprising:
a first vibration actuator including a first vibrating body and a first contact body in contact with the first vibrating body;
a second vibration actuator including a second vibrating body and a second contact body in contact with the second vibrating body;
a control unit configured to output a first control signal for controlling driving of the first vibration actuator, and output a second control signal for controlling driving of the second vibration actuator; and
a driving unit configured to (i) output a plurality of first alternating-current voltages based on the first control signal, for driving the first vibration actuator, and (ii) output a plurality of second alternating-current voltages based on the second control signal, for driving the second vibration actuator,
wherein the control unit has a common frequency setting unit,
wherein the control unit individually sets a phase difference of a first alternating-current voltage and a phase difference of a second alternating-current voltage or a voltage value of the first alternating-current voltage and a voltage value of the second alternating-current voltage based on the first control signal and the second control signal, respectively,
wherein the common frequency setting unit commonly sets a frequency of the first alternating-current voltage and a frequency of the second alternating-current voltage,
wherein the driving unit generates a first pulse signal having a first pulse width based on the first control signal and generates a second pulse signal having a second pulse width based on the second control signal, and commonly sets the voltage value of the first alternating-current voltage based on the first pulse signal and sets the voltage value of the second alternating-current voltage based on the second pulse signal,
wherein the control unit individually sets the voltage value of the first alternating-current voltage and the voltage value of the second alternating-current voltage based on the first control signal and the second control signal, respectively, and commonly sets the frequency of the first alternating-current voltage and the frequency of the second alternating-current voltage,
wherein, in a case where the first pulse width is a limit value of the first pulse width which is a first predetermined limit value, the control unit determines whether a first driving speed which is a speed of the first contact body relative to the first vibrating body is smaller than a first target speed which is a target driving speed and, in a case where the second pulse width is a limit value of the second pulse width which is a second predetermined limit value, the control unit determines whether a second driving speed which is a speed of the second contact body relative to the second vibrating body is smaller than a second target speed which is a target driving speed, and
wherein, in a case where the control unit determines that at least either the first driving speed is smaller than the first target speed or the second driving speed is smaller than the second target speed, the control unit lowers the frequency of the first alternating-current voltage and the frequency of the second alternating-current voltage in commonly setting the frequency of the first alternating-current voltage and the frequency of the second alternating-current voltage.

10. The vibration actuator control device according to claim 9, wherein the control unit individually sets the voltage value of the first alternating-current voltage and the voltage value of the second alternating-current voltage based on the first control signal and the second control signal, respectively, so as to bring a first driving speed which is a speed of the first contact body relative to the first vibrating body and a second driving speed which is a speed of the second contact body relative to the second vibrating body closer to each other.

11. The vibration actuator control device according to claim 9, wherein the control unit commonly sets the phase difference of the first alternating-current voltage and the phase difference of the second alternating-current voltage based on the first control signal and the second control signal.

12. The vibration actuator control device according to claim 9, wherein the driving unit generates a first pulse signal having a first pulse width and a second pulse signal having a second pulse width based on the first control signal and the second control signal, respectively, and individually sets the voltage value of the first alternating-current voltage and the voltage value of the second alternating-current voltage based on the first pulse signal and the second pulse signal, respectively.

13. An optical apparatus comprising:
the vibration actuator control device according to claim 9; and
an optical member.

14. An electronic device comprising:
the vibration actuator control device according to claim 9; and
a member.

15. A vibration actuator control device comprising:
a control unit configured to output a first control signal for controlling driving of a first vibration actuator including a first vibrating body and a first contact body in contact with the first vibrating body, and output a second control signal for controlling driving of a second vibration actuator different from the first vibration actuator and including a second vibrating body different from the first vibrating body and a second contact body different from the first contact body, wherein the second contact body is in contact with the second vibrating body; and
a driving unit configured to (i) output a first alternating-current voltage in a first plurality of phases, set based on the first control signal, for driving the first vibration actuator, and (ii) output a second alternating-current voltage in a second plurality of phases, set based on the second control signal, for driving the second vibration actuator,
wherein the control unit individually sets a phase difference of the first alternating-current voltage and a phase difference of the second alternating-current voltage or a voltage value of the first alternating-current voltage and a voltage value of the second alternating-current voltage based on the first control signal and the second control signal, respectively, and commonly sets a frequency of the first alternating-current voltage and a frequency of the second alternating-current voltage,
wherein the control unit sets, to a first lower limit, a resonance frequency of the first vibration actuator in a case where the phase difference of the first alternating-current voltage is zero degrees, sets, to a first upper limit, a maximum frequency of the first alternating-current voltage at which the first vibration actuator is drivable, sets, to a second lower limit, a resonance frequency of the second vibration actuator in a case where the phase difference of the second alternating-current voltage is zero degrees, and sets, to a second upper limit, a maximum frequency of the second alternating-current voltage at which the second vibration actuator is drivable, and
wherein the control unit commonly sets the frequency of the first alternating-current voltage and the frequency of the second alternating-current voltage in a range in which a range between the first lower limit and the first upper limit overlaps a range between the second lower limit and the second upper limit.

16. An optical apparatus comprising:
the vibration actuator control device according to claim 15; and
an optical member.

17. An electronic device comprising:
the vibration actuator control device according to claim 15; and
a member.

* * * * *